United States Patent [19]

Sanner et al.

[11] Patent Number: 5,268,834
[45] Date of Patent: Dec. 7, 1993

[54] STABLE ADAPTIVE NEURAL NETWORK CONTROLLER

[75] Inventors: Robert M. Sanner, Somerville; Jean-Jacques E. Slotine, Cambridge, both of Mass.

[73] Assignee: Massachusetts Institute of Technology, Cambridge, Mass.

[21] Appl. No.: 720,201

[22] Filed: Jun. 24, 1991

[51] Int. Cl.$^5$ .............................................. G05B 13/02
[52] U.S. Cl. .................................... 364/151; 364/148; 395/22
[58] Field of Search ................................... 395/21-23; 364/148, 150, 151, 157, 165

[56] References Cited

U.S. PATENT DOCUMENTS 4,466,054  8/1984  Shigemasa et al. ............... 364/157
5,159,660 10/1992  Lu et al. ................................ 395/22

FOREIGN PATENT DOCUMENTS 3-87901  4/1991  Japan .................................... 364/148

OTHER PUBLICATIONS

ICON '89 Proceedings, Apr. 1989, Jerusalem pp. 1-5.
Proceedings of the 25th IEEE Conference on Decision & Control, Dec. 1986, Athens, Greece, pp. 409-414.
Proceedings of the 29th IEEE Conference on Decision & Control, Dec. 1990, Honolulu, Hi., vol. 3, pp. 1757-1762.
IEEE Control System Magazine "Integrating Neural Networks and Knowledge-Based Systems for Intelligent Robotic Control" Handelman et al., Apr. 1990, pp. 77-87.

Primary Examiner—Jerry Smith
Assistant Examiner—Steven R. Garland
Attorney, Agent, or Firm—Wolf, Greenfield & Sacks

[57] ABSTRACT

An adaptive control system uses a neural network to provide adaptive control when the plant is operating within a normal operating range, but shifts to other types of control as the plant operating conditions move outside of the normal operating range. The controller uses a structure which allows the neural network parameters to be determined from minimal information about plant structure and the neural network is trained on-line during normal plant operation. The resulting system can be proven to be stable over all possible conditions. Further, with the inventive techniques, the tracking accuracy can be controlled by appropriate network design.

37 Claims, 10 Drawing Sheets

STABLE ADAPTIVE NEURAL NETWORK CONTROLLER

FIELD OF THE INVENTION

This invention relates to adaptive control systems and, in particular, to an adaptive control systems which use neural networks to estimate parameters of the controlled plant.

BACKGROUND OF THE INVENTION

Automatic control techniques are highly useful in a variety of applications including industrial manufacturing applications, numerically controlled machining systems and automated aircraft and ship navigation systems. A large amount of early control theory and design work focussed on linear systems. In such control systems, a key assumption must be made that the system operates over a small, closely controlled range in which system output is linearly related to the control parameters. In many cases a linear controller operates satisfactorily and extensive work has been done concerning the theory and design of such controllers.

However, in many other cases, especially when the range of required operation is large, the linear controller performs poorly or is unstable because nonlinearities in the system are not properly compensated. As an example, when a linear controller is used to control the operation of a robot arm in a manufacturing operation, the linear theoretic model used to design the control system for the robot, neglects the inevitably nonlinear forces associated with the mechanical motions of the arm. Consequently, the controller's accuracy quickly degrades as the movement speed of the robot arm increases. Consequently, in order to achieve a prespecified accuracy in even simple robot tasks such as machine tool replacement or object movement, the use of a linear controller requires that the speed of motion and, accordingly, the overall productivity, be restricted to a low range.

It is possible to design simple nonlinear controllers which can compensate for the nonlinear forces involved in many conditions to produce accurate operation over a large operating range. Consequently, productivity of such a system can be substantially increased by the use of such a nonlinear controller. However, in some control systems, such as the aforementioned robot arm, some of the parameters which drive the system are not known or cannot be easily predicted at the beginning of the control operation. For example, a robot arm may have to manipulate loads of various sizes, weights and mass distributions. Consequently, the initial and dynamic forces associated with the varying loads are not well known before the robot system operates. Even if a nonlinear controller is used, if the controller has constant gains incorporated into the control mechanism, the robot motion may become very inaccurate or unstable.

In other systems, for example, power systems and auto-navigation systems, the controlling parameters may be well understood at the beginning of control operation. However, unpredictable parameter variations may occur as the control operation proceeds. Unless the controller is continually changed during actual operation to accommodate these parameter variations, a controller design which is initially accurate and stable may not be able to control the system properly to compensate for all changes in the parameters. Consequently, a class of control systems known as adaptive control systems has been designed for these latter situations.

An adaptive control system that continuously "redesigns" the controller during operation can compensate for unexpected or unpredictable changes in the system parameters. For example, an adaptive control system can be used to control a robot arm to manipulate various loads by changing the motion parameters of the arm according to a sensed load condition.

Adaptive control systems are also useful for automatic navigation systems such as ship steering systems in which the characteristics of the ship depend on many uncertain and unpredictable parameters such as water, depth, ship loading and wind and wave conditions. Another field in which adaptive control systems have been profitably used is aircraft control in which the characteristics of the airplane depend on its altitude, wind speed, aircraft speed, and ground configuration. Adaptive systems have also been used in process control in which batches of materials must be processed. The adaptive systems can compensate for changes in the parameters which characterize the system from batch to batch.

In general, an adaptive control system is similar to a conventional control system in that the output of the system under control (called the "plant") is fed back to the controller which then generates a control output for the plant. However, an adaptive controller differs from an ordinary controller in that the parameters of the controller itself are variable and an "adaptation mechanism" is provided to adjust the controller parameters based on signals which are measured during on-line operation of the plant.

For linear systems, there are two conventional design structures for an adaptive controller. The first of these structures is called the "Model Reference Adaptive Control" (MRAC) structure and is composed of four main parts: the plant (which contains unknown or unpredictable parameters), a reference model which responds to a reference input to produce desired outputs which are theoretically the ideal response of the plant to the reference input, a parameterized controller which generates the control inputs to the plant and which is characterized by adjustable parameters, and an adaption mechanism which changes the adjustable parameters. During system operation, the reference model output is subtracted from the plant output to produce a "tracking error". The tracking error is provided to the adaption mechanism which then adjusts the controller parameters to minimize the tracking error.

There are two conventional types of adaption mechanisms. One type of mechanism estimates the plant parameters and then computes the controller parameters from the estimated plant parameters and is called an "indirect" system. The other type of adaption mechanism computes the controller parameters directly from the tracking error and plant output and is called a "direct" system.

The second type of adaptive control structure commonly used with linear systems is called a self-tuning controller (STC). This structure consists of the plant, a parameterized controller which generates the control inputs to the plant and which is characterized by adjustable parameters, and an estimator circuit which computes the controller parameters from estimated plant parameters. Both the control input to the plant and the output from the plant are provided to the estimator circuit which generates a set of controller parameters that are appropriate to the plant input and output data. As with the MRAC system, there are two conventional types of estimator circuits: an "indirect" circuit and a "direct" circuit.

It even proves possible to extend slightly the MRAC and STC systems for certain classes of non-linear systems. All of these designs have depended crucially upon the existence of a known linear parameterization of the uncertainty in the plant dynamics. This implies that the exact form of the dynamic equations which govern plant operation are known, but some of the parameters of the equations may not be known. If the plant dynamics are known, it is possible, in many cases, with conventional linear adaptive design theory to design a control system which will be both stable and accurate.

The above methods cannot be used if the exact parameterization is unknown or if the uncertainty cannot be parameterized linearly. Some prior art attempts were made to design adaptive controllers in the absence of linear parameterizations based on "intuitive" design techniques. A well-known example of this type of analysis involves the use of the so-called "gradient" techniques which attempted to control a plant by minimizing a pre-defined "cost" function. These techniques were not based on an underlying mathematical theory which could be used to prove that the systems would be stable under all conditions. Consequently, these attempts appeared to work during simulations or in the laboratory, but failed in actual control situations in which other variables which were not modeled contributed significantly to the overall system performance.

Recently, some prior art suggestions have been made to use a neural network to overcome the need for a linear-parameterization model. In many schemes, the neural network is first "trained" by providing it with a selected set of pre-recorded data about plant inputs and corresponding outputs. After the network is trained, it is used to generate a model of the plant. In theory, the trained network should provide an accurate estimate of the plant output to an input not previously provided to it and the network could then be used to design the required controllers.

The problem with this latter arrangement was that the prior art methods that were used to "train" the network were back-propagation methods which were essentially similar to the previously-used "gradient" methods. Consequently, these latter techniques suffered from the same problems as the prior gradient techniques. In particular, since there was no underlying proof of stability, systems which performed well in the laboratory might become unstable in real-world operations. Further, these design techniques never considered the effect of operation outside a carefully-defined operating range, so that the resulting system would be unable to handle disturbances which cause it to stray outside the defined range.

Other attempts were made to train the neural network by connecting the network to the actual plant inputs and outputs as the plant operated in actual use. Various schemes were then devised to use the trained network "on-line" in a feed-forward control system. Such systems were still prone to inaccuracies or instabilities due to unexpected situations and, due to the lack of an underlying theory, there was no known way to correctly specify the network parameters such as the number of layers necessary or the number of nodes per layer which would be necessary to guarantee stability.

Accordingly, it is an object of the present invention to provide an adaptive control system which can be proven to be stable even though the linear parameterizations of the plant dynamics are not known.

It is another object of the present invention to provide an adaptive control system which can be designed using only basic information regarding the "smoothness" of the plant dynamics, which smoothness can be ascertained using conventional Fourier techniques.

It is still another object of the present invention to provide an adaptive control system which can specify the number of layers in a neural network and the number of nodes necessary to guarantee stability based on the amount of tracking error that can be tolerated.

It is yet another object of the present invention to provide an adaptive control system which uses adaptive control techniques within a normal plant operating range, but which is stable even though plant operating characteristics occur outside of the normal operating range.

It is a further object of the present invention to provide an adaptive control system which smoothly switches from an adaptive control strategy to an alternate control strategy when the adaptive control strategy fails.

SUMMARY OF THE INVENTION

The foregoing objects are achieved and the foregoing problems are solved in one illustrative embodiment of the invention in which an adaptive control system uses a neural network to provide adaptive control when the plant is operating within a normal operating range, but shifts to other types of control as the plant operating conditions move outside of the normal operating range.

The controller uses a structure which allows the neural network parameters to be determined from minimal information about plant structure and the neural network is trained on-line during normal plant operation. The resulting system can be proven to be stable over all possible conditions. Further, with the inventive techniques, the tracking accuracy can be controlled by appropriate network design.

DETAILED DESCRIPTION OF A PREFERRED EMBODIMENT

Figure 1:
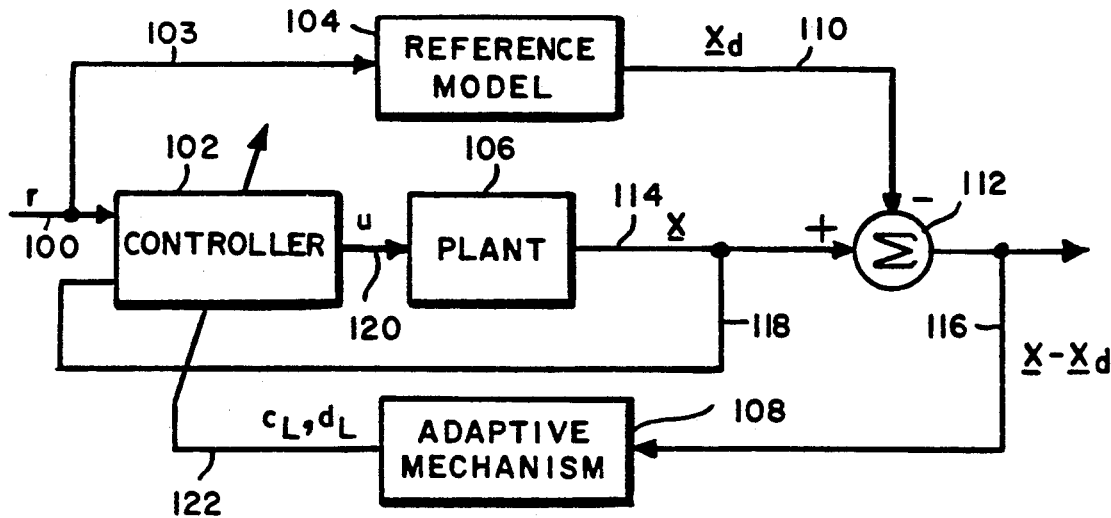
FIG. 1 is a block schematic diagram of a prior art MRAC adaptive control system.

In the ensuing discussion, the mathematical theory underlying the present invention will first be discussed. Subsequently, an illustrative control system design using the underlying theory will be discussed in detail. The following discussion is a summary of a rigorous mathematical theory presented in detail in the paper entitled Gaussian Networks For Direct Adaptive Control by Robert M. Sanner and Jean-Jacques E. Slotine, a copy is included in the patented file. As such, the detailed analysis presented in the paper should be understood as the proper mathematical expression of the underlying theory and some inaccuracies may be introduced in this summary.

Control System Theory

In the discussion following it is assumed that the plant has equations of motion which can be represented by the general form:

$$x^{(n)}(t) + f(x(t), x(t), \ldots, x^{(n-1)}(t)) = bu(t) \quad (1)$$

where a plant output is represented by $x(t)$, $x^{(n)}(t)$ is the nth derivative of $x(t)$ with respect to t, $u(t)$ is a control input which drives that output and b is an arbitrary gain. In general, the function, $f(x(t), x(t), \ldots, x^{(n-1)}(t))$, in equation (1) will be an unknown linear or nonlinear function.

The objective of the control system is to drive the plant state vector which can be expressed as $x = [x, x, \ldots, x^{(n-1)}]^T$ to follow a prespecified desired trajectory $x_d = [x_d, x_d, \ldots, x_d^{(n-1)}]^T$. A "tracking error" vector $x(t)$ is defined as $x(t) = x(t) - x_d(t)$. With these definitions, the problem becomes the specification of a control law which insures that $x(t)$ goes to zero as time goes to infinity.

In order to design such a control law it is necessary to make some assumptions about the structure of the function $f(x(t), x(t), \ldots, x^{(n-1)}(t))$, in equation (1). Specifically, it can be shown that, if the function f can be smoothly truncated outside a selected compact set in such a way that the spatial Fourier transform of this truncation is absolutely integrable, then sampling theory indicates that the function itself can be uniformly approximated to a chosen degree of accuracy on that set with a linear superposition of a finite number of interpolating functions (that is, only a finite number of samples are required).

Mathematically, if the function f can be smoothly truncated outside a selected compact set in such a way that the spatial Fourier transform of this truncation is absolutely integrable, then the condition:

$$|f(x) - f_A(x)| \leq \epsilon_f \quad (2)$$

can always be satisfied, where $f_A(x)$ is a radial gaussian neural network approximation of $f(x)$ over a chosen compact set, A, consisting of a truncated series expansion containing a finite number of terms resulting from a finite number of samples, and $\epsilon_f$ is a prespecified accuracy which can be made vanishingly small.

Any interpolating function can be used for the approximation, provided that its spectrum is real-valued, strictly positive, and integrable on $R^n$, the plant state space. In one preferred embodiment a radial Gaussian function is chosen to be the interpolating function. It is known that any continuous function, not necessarily infinitely smooth, can be uniformly approximated by linear combination of Gaussian functions. Gaussian radial interpolation functions are particularly attractive because they are bounded, strictly positive and absolutely integrable on $R^n$, and further, they are their own Fourier transforms (modulo a scale factor). Thus, the radial gaussian can hence be used as the reconstructing function in the expansion $f_A(x)$. The representation $f_A$ takes the form:

$$f_A(x) = \Sigma c_I g_\sigma(x, \xi_I) \quad (3)$$

where the points $\xi_I$ encode a uniform lattice:

$$\xi_I = i_1 \Delta + i_2 \Delta + \ldots + i_n \Delta \quad (4)$$

where $I = \{i_1, \ldots, i_n\}$ is an n-tuple of integers and $c_I = c(\xi_I)$ are constants associated with each sample point and $\sigma$ is the standard deviation of the gaussian function, $g_\sigma$.

The number of terms in the expansion is given by $I_o$ which is determined by the size of the region over which f must be approximated, the sample spacing $\Delta$, and the approximate error which can be tolerated. More particularly, the approximation error results from three sources: (1) an error which arises because f is not band-limited as originally assumed; (2) an error which arises because the gaussian reconstruction functions are not exactly band limited and (3) an error which arises because the infinite series of gaussian functions which would exactly reconstruct f must be truncated to allow reconstruction with a finite number of elements. As shown in the attached paper, the error from each of these sources can be shown to be less than $\epsilon_f/3$ so that the overall error is less than $\epsilon_f$. More specifically, the magnitudes of errors (1) and (2) above are related to the choice of $\Delta$ and $\theta$ and the magnitude of error (3) is related to the number of samples $I_o$.

Unlike other reconstructing functions which might also be used in expansion equation (3), for example, n-fold products of sinc or Bessel functions, whose structure changes depending upon the dimension of the underlying space, the radial gaussian and its spectrum have exactly the same representation regardless of dimension. Hence, this design can apply to dynamic systems of any order. The standard form the radial gaussian function is given by:

$$g\sigma(x,\xi) = \quad (5)$$

$$\exp\left(-\frac{||x - \xi||^2}{\sigma^2}\right) = \exp\left(-\frac{(x - \xi)^T(x - \xi)}{\sigma^2}\right)$$

Further, the gaussian is a separable nonlinearity, so that instead of computing a single non linear transform of the entire state vector, individual subspaces of $R^n$ may be transformed separately, then multiplied together to form the final approximation.

The radial gaussian function conveniently allows the expansion (3) to map directly to a class of three-layer neural networks employing a single layer of "neurons" (or nodes) with radial gaussian input-output characteristics.

More particularly, a particular n-dimensional point, x, at which the approximation $f_A(x)$ is required, forms the input to the network. The number of nodes in the network is determined as previously discussed, and the weights connecting the network inputs to each gaussian node encode the points $\xi_I$ in the sampling grid. Each node computes a quadratic "activation energy" from its inputs and feed in weights, given by:

$$r_I^2 = ||x - \epsilon_I||^2 (x - \epsilon_I)^T(x - \epsilon_I) \quad (6)$$

and outputs the gaussian of this activation, $\exp(-r_I^2/\sigma^2)$. The network output is formed by weighting each nodal output by the corresponding $c_I$, and summing together all the weighted outputs. The result represents the approximation $f_A(x)$.

The sampling density and variance should be chosen such that the Gaussian's spectrum is strictly positive on the support of the bandlimited version of f, yet approaches zero quickly enough that the high frequency components contribute negligibly in the inverse transform. The following combination has been found to work well:

$$\sigma^2 = \beta^2 \pi \text{ and } \Delta^2 = 1/8\sigma^2 \quad (7)$$

Therefore, if the set A constitutes the region of "normal operation" of the control system, a controller constructed of a finite number of elements can be used to control the system within this range.

Any additional information known about f can be used in sharpening the above bounds or reducing the size of the required representation. If information about the shape and orientation of the spectrum is known, the distance between the sampling points can be adjusted accordingly. For example, if f is known to have a spectral support which is much smaller in one direction in $R^n$ the sample spacing for the corresponding direction in the sampling grid on $R^n$ can be taken proportionally larger, reducing the number of nodes required.

For an arbitrary function, it may be difficult to establish precisely the tightest possible bounds $\epsilon_f$ on the approximation errors. However, if the assumed value of $\beta$ accurately reflects the frequency content of $f_F$, it can be expected that the bound $\epsilon_f$ will be dominated by the error introduced in truncating the infinite expansion series which exactly represents $f_F$. By estimating the magnitude of the contributions of the omitted nodes to points in the set A, a conservative upper bound on this truncation error can be established. In accordance with the inventive adaptive control algorithms discussed below, it is only necessary that the crude bound thus developed exceed the true uniform bound on the approximation errors.

However, the approximation error outside of the set A, or outside of the normal operating range, is of great importance and has been completely overlooked by prior art designs. This function reflects the fact that the accuracy of the estimate implemented by the aforementioned approximations may degrade rapidly outside the normal operating range. It is easy to see that the worst case bound on this degradation, $\alpha(x) = |f(x)| + |f_A(x)|$, can be achieved, especially in the case of gaussian interpolating functions. Since the approximation implemented by a gaussian network decays smoothly to zero as x moves radially away from the set A, a function, f, which changes sign quickly just outside of A would result in the above equality for $\alpha(x)$. The output of the gaussian network approximation, $f_A$, in this situation would be incorrect both in magnitude and in sign. This rapid degradation of the neural approximation outside of the normal operating range for which the network was designed must be taken into consideration.

If the desired plant state trajectories are contained in a normal operating range which is a compact subset, $A_d$, of the plant state space, in principle, the tracking problem associated with the plant dynamics described in equation (1) could be solved by an adaptive component in the control law capable of reconstructing the unknown function f everywhere on $A_d$. Since expansion equation (3) provides a network structure which can approximate (sufficiently smooth) unknown plant nonlinearities with a prespecified accuracy, uniformly on a particular compact subset, the adaptive component of the controller can be taken as the output of this network. The small approximation errors thus introduced could then be viewed as a uniformly bounded disturbance driving the plant dynamics, and conventional deadzone adaptive control theory could then be used to derive stable adaptive control laws.

However, it is possible with such a scheme that the tracking errors would become sufficiently large during the initial stages of adaptation that the plant state could leave the normal operating range, $A_d$. Further, impulsive, unmodeled disturbances might also force the plant state outside this range. The ability of a neural adaptive element to approximate f degrades rapidly as the state moves outside of the region for which the network was designed. As discussed previously, if the plant moves outside of the normal operating range, it is possible for the approximation implemented by such an adaptive system to be incorrect not only in relative magnitude, but also in sign, indicating that the contribution of the adaptive system in this case would force the plant dynamics in precisely the wrong direction. Simple deadzone adaptation will not suffice to ensure stability of the system under these conditions.

However, in accordance with another aspect of the invention, this problem can be overcome by including in the control law an additional component which takes over from the adaptive component as its approximation ability begins to degrade, and forces the plant state back into the normal operating range. Preferably, this component takes the form of a sliding controller with a boundary layer, and its design is straightforward given upper bounds on the magnitudes of the functions being approximated. The action of this sliding term will be shown to be sufficient to reduce the tracking error during the times when the plant state lies outside of the normal operating range, while the boundary layer prevents control chattering in the regions at the edges of the normal operating range.

To prevent unnecessary contention between the sliding component and the (typically erroneous) output of the adaptive subsystem when the plant state lies outside of the normal operating range, the entire adaptive portion of the controller—both the adaptive output and the adaptive adjustment mechanism—must be turned off when the sliding controller is active. Similarly, it is beneficial to turn off the sliding controller when the approximation implemented by the adaptive controller is accurate, since the sliding controller relies on crude upper bounds of the plant nonlinearities to reduce tracking errors and is hence likely to require large amounts of control authority when active.

In accordance with another aspect of the invention, the complete control law thus has a dual character, acting as either a sliding or as an adaptive controller depending upon the instantaneous location of the plant state vector. However, discontinuously switching between adaptive and sliding components creates the possibility that the controller might chatter along the boundary between the two types of operation. To prevent this, pure sliding operation is restricted to the exterior of a slightly larger set A, containing the normal operating range, $A_d$, while pure adaptive operation is restricted to the interior of the set $A_d$. In accordance with another aspect of the invention, in between, in the region $A - A_d$, the two modes are effectively blended using a continuous modulation function, which controls the degree to which each component contributes to the complete control law. The resulting controller smoothly transitions between adaptive and nonadaptive control strategies and is capable of globally stabilizing the systems under consideration.

The structure of the inventive control law has the following general form:

$$u(t) = u_{pd}(t) + (1 - m(t))u_{ad}(t) + m(t)u_s(t) \quad (8)$$

where $u_{pd}(t)$ is a negative feedback term associated with a proportional/derivative controller and consists of a weighted combination of both the measured tracking error states and a tracking metric $s(t)$, to be defined below. The term $u_s(t)$, represents the sliding component of the control law, and, similarly, the adaptive component is represented by $u_{ad}(t)$. The function $m(t) = m(x(t))$ is a continuous, state dependent modulation term which allows the controller to smoothly transition between sliding and adaptive modes of operation, chosen so that $m(x) = 0$ in the normal operating range, $A_d$; $m(x) = 1$ outside of the expanded range, A; and $0 = m(x) < 1$ on $A - A_d$.

To aid in the construction of this modulation, the normal operating range, $A_d$, should be chosen so as to correspond to a unit ball with respect to an appropriate weighted norm function. This certainly poses no problem since, as long as $A_d$ contains all the trajectories the plant will be required to follow, and A is chosen to completely contain $A_d$, the actual dimensions of these sets are arbitrary. Thus, $A_d$ and A can be defined by $$A_d\{|||x - x_0||_{p,w} \leq 1\} \text{ and}$$
$$A = \{|||x - x_0||_{p,w} \leq 1 + \Psi\}. \quad (9)$$

Here $\Psi$ is a positive constant representing the width of the transition region, $x_0$ fixes the absolute location of the sets in the state space of the plant, and $||x||_{p,w}$ is a weighted p-norm of the form $$||x||_{p,w} = \left\{ \sum_{i=1}^{n} \left( \frac{|x_i|}{w_i} \right)^p \right\}^{\frac{1}{p}}, \quad (10)$$

or, in the limiting case $p = \infty$, $$||x||_{\infty,w} = \max\left( \frac{|x_1|}{w_1}, \frac{|x_2|}{w_2}, \ldots, \frac{|x_n|}{w_n} \right), \quad (11)$$

for a set of strictly positive weights $\{w_i\}_{i=1}^n$. In $R^2$, for example, with $p = 2$ the sets $A_d$ and A are ellipses, and with $p = \infty$ these sets are rectangles. With these definitions, the modulation function can be taken as, $$m(x(t)) = \max\left( 0, sat\left( \frac{(r(t) - 1)}{\Psi} \right) \right) \quad (12)$$

where $r(t) = ||x(t) - x_0||_{p,w}$, and sat is the saturation function (sat(y) = y if $|y| < 1$, and sat (y) = sign (y) otherwise). When $r(t) \leq 1$, meaning that x is in $A_d$, the output of the saturation function is negative, hence the maximum (which defines m(t)) is zero, as desired. When $r(t) \geq 1 + \Psi$, corresponding to an x outside the expanded range A, the saturation function is unity, as desired. In between, for x in the range $A - A_d$, it is easy to check that $0 < m(x) < 1$.

To illustrate the structure of the adaptive controller, consider for example a unity control gain system represented in equation (1) with b = 1. The adaptive control component, $u_{ad}(t)$, for this system would implement an approximation, $f_A(x)$, to the plant nonlinearity f(x), which is realized as the output of a radial gaussian neural network whose inputs are the measured values of the plant states. The variance and mesh size of this network are designed considering assumed upper bounds on the spectral properties of the plant nonlinearity f(x). Hence the adaptive portion of the controller can be represented as:

$$u_{ad}(t) = \sum_{I \in X_o} c_I(t) g_\sigma(x(t), \xi_I) \quad (13)$$

The input weights, $\xi_I$, which encode the sampling mesh, are fixed in this architecture, while the output weights, $c_I(t)$, are to be adjusted to attempt to match their values, $c_I$ when the system has been trained. The set of terms is chosen so that the bound on the uniform approximation error, $\epsilon_f$ produced by the trained network over the normal operating range is small enough to allow the desired tracking accuracy, which is related to the function approximation capability of the network through equation (37) below.

As discussed above, the selection of the desired function approximation specifies the subset $I_o$ of the uniform, square sampling mesh which must be used to reconstruct the function f, and, thus, the number of nodes required and the precise values of the corresponding $\xi_I$ are also determined.

It is helpful to process the tracking error variables $x - x_d$ in order to simplify the resulting controller designs. A useful tracking error metric for both the sliding and adaptive control subsystems is defined by $$s(t) = \left(\frac{d}{dt} + \lambda\right)^{n-1} x(t) \text{ with } \lambda > 0, \quad (14)$$

which can be rewritten as $s(t) = \lambda^T x(t)$ with $\lambda^T = [\lambda^{n-1}, (n-1)\lambda^{n-2}, \ldots, 1]$. The equation $s(t) = 0$ defines a time varying hyperplane in $R^n$ on which the tracking error vector decays exponentially to zero, so that perfect tracking can be asymptotically obtained by maintaining this condition. Further, if the magnitude of s can be shown to be bounded by a constant $\Theta$, the actual tracking errors can be shown to be asymptotically bounded by:

$$|x^{(i)}(t)| \leq 2^i \alpha^{i-n+1}\Theta, \, i=0, \ldots, n-1 \quad (15)$$

Using the metric $s(t)$ and the saturation function defined above, the sliding control component can be represented as:

$$u_{sl}(t) = -k_{sl}(x(t)) \, \text{sat}(s(t)/\Phi) \quad (16)$$

where $k_{sl}(x)$ is the gain of the controller, and $\Phi$ is the width of a boundary layer surrounding the sliding surface in accordance with conventional sliding control theory. The exact values chosen for each of these parameters are determined by the previously-mentioned assumptions concerning f and the accuracy of the reconstruction desired from the network. Examples are given below.

The deadzones required in the algorithm for updating the output weights of the gaussian network reflect the fact that no useful information can be gained about the quality of the current approximation when the tracking errors are less than a threshold determined by the bounds on the approximation errors, e.g., $\epsilon_f$. However, deadzone adaptation requires discontinuously starting and stopping the parametric adjustment mechanism according to the magnitude of the error signal. These discontinuities can be eliminated using the metric $s(t)$ and by introducing the continuous function $s_\Delta$, defined as $$s_\Delta = s(t) - \Phi \text{sat}(s(t)/\Phi) \quad (17)$$

The variable $s_\Delta$ has several properties useful in the design of adaptive laws: if $|s| < \Phi$ then $s_\Delta = \dot{s}_\Delta = 0$, while if $|s| > \Phi$, then $\dot{s}_\Delta = \dot{s}$, and $|s_\Delta| = |s| - \Phi$.

Applying these principles to a system in the form of equation (1) with $b = 1$ and assuming that a prior upper bound $M_o(x)$ is known on the magnitude of f for points outside of the normal operating range, $A_d$, the error metric $s(t)$ will have a time derivative given by:

$$\dot{s}(t) = a_r(t) - f(x) + u(t) \quad (18)$$

where $a_r(t) = \lambda_v^T X(t) - X_d^{(n)}$ with $\lambda_v^T = [0, \lambda^{n-1}, (n-1)\lambda^{n-2}, \ldots \lambda]$, and $x_d^{(n)}$ is the nth derivative of the desired trajectory. Having chosen a set A containing $A_d$ as outlined above, let $f_A(x)$ be a radial gaussian approximation to $f(x)$ designed such that $|f - f_A| \leq \epsilon_f$ uniformly on the set A. In terms of this approximation, equation (18) can be rewritten as:

$$\dot{s}(t) = a_r(t) - f_A(x) + d(x) + u(t) \quad (19)$$

$d(x) = f_A(x) - f(x)$ satisfies $|d| \leq \epsilon_f$ in the normal operating range. This expression, and the considerations of the previous section, suggests use of the control law:

$$u(t) = -k_d s(t) - a_r(t) + (1 - m(t))f_A(x(t)) + m(t)u_{sl}(t) \quad (20)$$

where $k_d$ is a constant feedback gain. The sliding component of this control law is given by equation (16) with state dependent gains $k_{sl}(x(t)) = M_0(x(t)) + \epsilon_f$, and the adaptive component $f_A(x(t))$ is realized as the gaussian network described by equation (13) above, whose tuned output implements the approximation $f_A$. The modulation function which blends the two controller modes is specified by equation (12).

If the parameters in $f_A(x(t))$ are updated as:

$$\dot{C}_j(t) = -k_a(1 - m(t))s_{66} g_j(X(t), \xi_j), \quad (21)$$

where $k_a$ is a positive constant determining the adaption rate, and if $\Phi$ is chosen so that $\Phi \geq \epsilon_f/k_d$ in both the sliding controller and the calculation in equation (17) of $s_{66}$, then all states in the adaptive system will remain bounded, and moreover the tracking errors will asymptotically converge to a neighborhood of zero given by:

$$|x^{(i)}(t)| \leq 2^i \lambda^{i-n+1} \Phi, \, i=0, \ldots, n-1 \quad (22)$$

The previous design procedure can be extended to plants with non-unity control gains which have dynamic equations of the form:

$$x^{(n)}(t) + f(x(t)) = b(X_T(t)) u(t) \quad (23)$$

where $x_T = [x, \dot{x}, \ldots, x^{(n-2)}]^T$, and it is assumed that the control gain is bounded away from zero and of known sign for al x. Without loss of generality, this sign can be taken as positive, so that $$0 < M_1(X_T) \leq b^{-1}(X_T) \leq M_2(X_T) \quad (24)$$

It is further assumed that a prior bound is known for the norm of the gradient of this inverse, so that:

$$|\dot{b}^{-1}(X_T)| = |\nabla b^{-1}(X)X_T| \leq M_3(X)||X||. \quad (25)$$

As above, it is also assumed that an upper bound is known for f; to facilitate the development below, it is most convenient to combine this knowledge with the bound on $b^{-1}$ to produce $$|b^{-1}(x)f(x)| \leq M_0(x) \quad (26)$$

As before, define $s(t) = \lambda^T x(t)$, so that $$b^{-1}\dot{s} = b^{-1}a_r - b^{-1}f + u \quad (27)$$

with $a_r$ is defined as previously stated. Define the unknown nonlinear function $h = b^{-1}f$, and let $h_A$ and $b_A^{-1}$ be a radial gaussian network approximation to the functions h and $b^{-1}$ respectively with the properties, valid on the chosen set A:

$$|h(X) - h_A(X)| \leq \epsilon_h \text{ and } |b^{-1}(X_T) - b_A^{-1}(X)| \leq \epsilon_b, \quad (28)$$

where $\epsilon_h$ and $\epsilon_b$ are as small as desired. There is no conceptual problem approximating $b^{-1}(X_T)$ by a function of the entire state vector instead of Just $x_T$; this fact will also allow a considerable simplification in the design of the adaptive subsystem, as will be discussed below.

With these definitions, equation (27) can be rewritten as:

$$b^{-1}s = b_A^{-1}a_r - h_A + d + u \quad (29)$$

where the disturbance term d is here given by:

$$d(x,x_d) = (b^{-1}(x_T) - b_A^{-1}(x))a_r - (h(x) - h_A(x)) \quad (30)$$

and thus satisfies the inequality:

$$|d(x,x_d)| \leq \epsilon_h + \epsilon_b |a_r| \quad (31)$$

when x is in A. Equation (30) suggests a control law of the form:

$$u(t) = -k_d s(t) - \frac{1}{2} M_3(x(t)) \|x(t)\| s_\Delta(t) + m(t)u_{sl}(t) - \quad (32)$$

$$(1 - m(t))[b_A^{-1}(x(t))a_r(t) - h_A(x(t))]$$

for some positive constant $K_d$. The sliding term, $u_{sl}(t)$, is again given by (16) with state dependent gain $$k_{sl}(X,X_d) = (M_o(X) + \epsilon_h) + (M_2(X) + \epsilon_b)|a_r|. \quad (33)$$

Note particularly that the adaptive component of this control law estimates $b^{-1}$ itself, as opposed to estimating b and inverting the estimate.

The adaptive components of this control law, $h_A$ and $b_A^{-1}$, can each be realized as the output of a network of radial gaussian nodes similar to the one described for the unity gain system. Each network is designed considering assumed upper bounds on the spectral supports of h and $b^{-1}$ respectively, as well as the set of desired trajectories the system is required to track, and approximation accuracy desired. It is possible to simplify this design somewhat by employing a single network, with the n state variables as inputs, and the two adaptive approximations as the outputs. The number of gaussian nodes and the corresponding input weights for this network are chosen to correspond to a sampling grid with the smaller of the two mesh sizes which would be used in the separate networks. This network then has two sets of output weights for each node, $c_I(t)$ and $d_I(t)$, creating two outputs which are the approximations $h_A(x(t))$ and $b_A^{-1}(x(t))$ respectively:

$$h_A(x(t)) = \sum_{I \in X_o} c_I(t) g_\sigma(x(t), \xi_I) \quad (34)$$

$$b_A^{-1}(x(t)) = \sum_{I \in X_o} d_I(t) g_\sigma(x(t), \xi_I)$$

As before, the input weights encoding the sampling mesh are fixed in this architecture, and the output weights $c_I(t)$ and $d_I(t)$ are adjusted to match their trained values, $c_I$ and $d_I$, in the expansions $h_A$ and $b_A^{-1}$ respectively.

Choose the adaptation law for these parameters to be:

$$c_I(t) = -k_{a1}(1 - m(t))s_\Delta(t) g_\sigma(x(t), \xi_I) \quad (35)$$

$$d_I(t) = k_{a2}(1 - m(t))s_\Delta(t) a_r(t) g_\sigma(x(t), \xi_I)$$

where $k_{a1}$ and $k_{a2}$ are strictly positive constants determining the adaptation rare. Define $$\epsilon_r = \epsilon_h + \epsilon_b(2\|\lambda\| r_a + |x_d^{(n)}|_{max}), \quad (36)$$

with $r_a$ being the radius of the largest n-ball containing the set A, and $|x_d^{(n)}|_{max}$ an upper bound on the magnitude of the nth derivative of the reference trajectory. If $\Phi$ is chosen such that $\Phi \geq \epsilon_r/k_d$ in both the sliding controller and the calculation in equation (17) of $s_\Delta$, then all states in the adaptive system will remain bounded, and moreover the tracking errors will asymptotically converge to a neighborhood of zero given by:

$$|x^{(i)}(t)| \leq 2^i \lambda^{i-n+1} \Phi \; i = 0, \ldots, n-1 \quad (37)$$

Note that this inequality, together with the definitions of $\Phi$ and $\epsilon_r$, implies that a good approximation to $b^{-1}$ is much more critical to reduction of the asymptotic tracking errors than is approximation to h; this consideration should be reflected in the network design.

Since the desired trajectories are contained completely within the normal operating range, $A_d$, and since the tracking errors converge to a neighborhood of zero, eventually all the plant trajectories will converge to a set which is either within a small neighborhood of the set $A_d$, or else is completely contained inside it. In particular, the sliding subsystem will asymptotically be used less and less, and, since the negative feedback terms decay to zero as the tracking error does, the control input will eventually be dominated by the outputs of the neural network, regardless of the initial conditions on the plant or network parameters.

While the use of the proposed neural controllers allows the design of adaptive algorithms which can stably control plants with limited knowledge of the functions driving their dynamics, one still cannot ignore robust stability issues. The adaptive controller can compensate for dynamic effects attributable only to the states it "sees", i.e. those which are measured and which form the inputs to the gaussian networks. There is no way for the adaptive architecture described to compensate for dynamic effects due to (temporal) high frequency modes neglected in the above models. It is thus necessary to ensure that the control signal issued by the network is free from any (temporal) high frequency components which might excite these modes. Inspection of the adaptation laws suggests that the magnitude of the adaptation signals will be much larger for the $d_I$ than for the $c_I$. To prevent excessively rapid adaptation from adding high frequency components to the control signal, it is hence desirable to choose the adaptation gain $k_{a2}$ to be much smaller than that of $k_{a1}$.

Choosing the same parameter to control both the adaptation deadzone and the sliding controller boundary layer allows one to guarantee convergence of the tracking errors to the same neighborhood of zero regardless of location of the state vector. However, if extreme tracking accuracy is required, and the network is designed to produce the required reconstruction accuracy, the resulting choice of $\Phi$ might produce a sliding controller with a boundary layer so thin it risks exciting the high frequency dynamic modes when this component is active. This suggests that the value of $\Phi$ used, and hence the resulting tracking accuracy, must arise as a tradeoff between the frequency range of the unmodeled dynamics and trajectory following requirements.

The parameter $\Psi$, which defines the size of the transition region $A-A_d$ between adaptive and sliding operation, in a sense also represents the width of a boundary layer, serving to smooth the transition between the two controller modes. Since, with a zero width transition region, there is a possibility the controller might chatter along the boundary of the set $A_d$, the same comments which apply to $\Phi$ above also apply to $\Psi$: the transition region should be "thick" enough that there is no possibility that the mode switching might excite unmodeled dynamics.

SIMULATION EXAMPLES

Figure 10A:
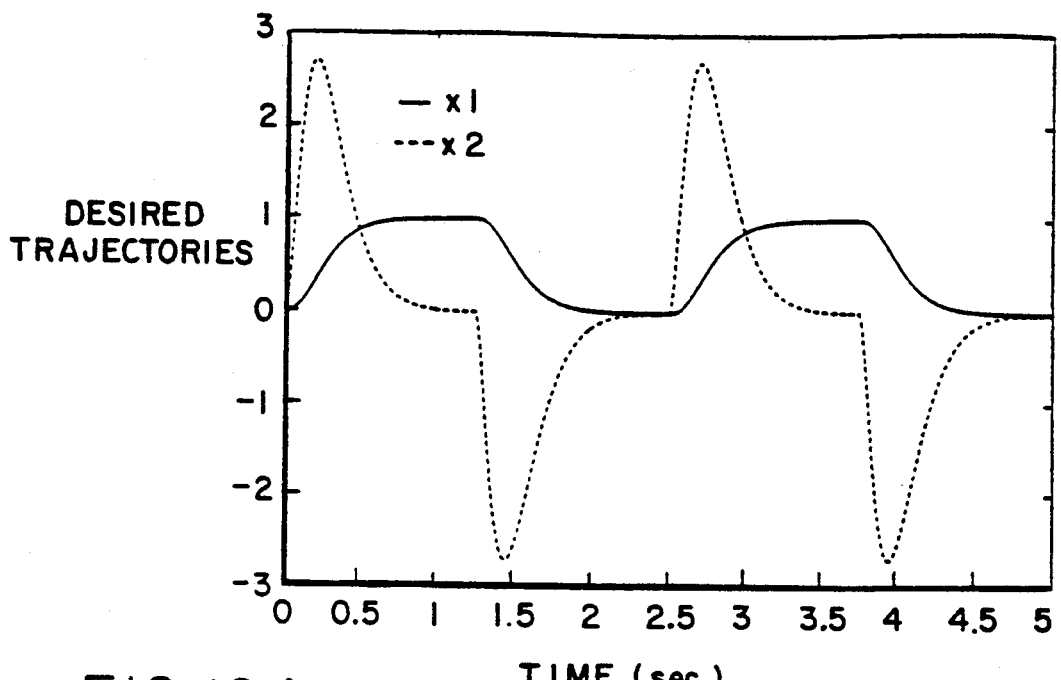
FIG. 10A is a graph of desired trajectories versus time of a first stimulation.
Figure 10B:
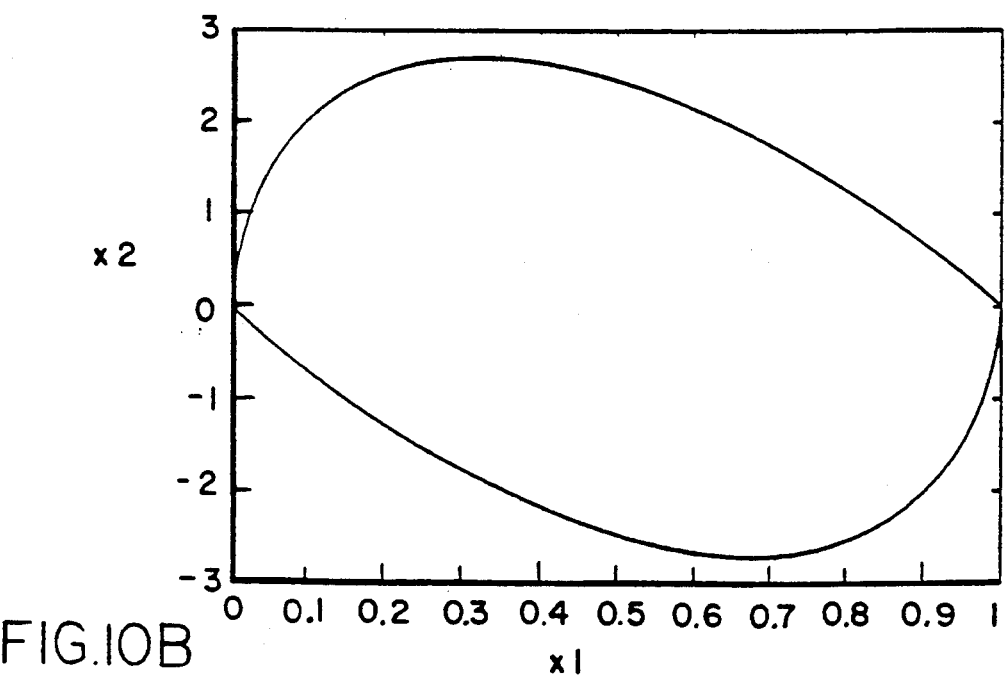
FIG. 10B is a phase space portrait of desired trajectories of a first simulation.

In the simulation examples which follow, a two-dimensional plant is required to track a set of desired trajectories which are specified as the output of a third order, critically-damped system with a bandwidth of 10 rad/sec driven by a unity amplitude, 0.4 Hz. square wave. FIG. 10 shows a phase space portrait of the desired position and velocity. Based upon this portrait, the set $A_d$ was chosen to be the unit ball with respect to the weighted infinity norm $$\|x\|_{\infty,w} = \max\left(|x|, \frac{|x|}{3.0}\right), \qquad (38)$$

centered at $x_o = [0.5, 0]^T$. This corresponds to the rectangular subset of the state space, $A_d = [-0.5, 1.5] \times [-3.0, 3.0]$. A thin transition region between adaptive and sliding operation was chosen for these simulations, corresponding to a value of $\Psi = 0.025$ in equation (12), so that $$A = \{X \mid \|x - x_O\|_{p,w} \le 1.025\} \qquad (39)$$

For the first simulation, a two dimensional plant with unity control gain, i.e. equation (1) with $n=2$ and $b=1$. The plant nonlinearity f is assumed to have a spectral support of $\beta=2$, and equation (7) suggests gaussian nodes with variance $o^2 = 4\pi$ whose input weights encode a sampling grid with sample spacing $\Delta = (32\pi)^{-\frac{1}{2}} \sim 0.1$. A truncation value of $\rho = 0.5$ is used in the truncation of the function expansion and, for simplicity, the resulting sample set, $\Gamma$, is taken as the smallest rectangle which contains all the points in this truncated sampling grid, $\Gamma = [-1.0, 2.0] \times [-3.5, 3.5]$. This set actually encloses a few mesh points of distance further than 0.5 to points in A, but the value 0.5 will be used in developing conservative bounds on the truncation error. This definition of $\Gamma$ results in a network with 2201 gaussian nodes whose output weights are adjusted according to equation (21) with $k_a = 500$.

Using the truncation radius $\rho = 0.5$, the omitted nodes closest to the set A contribute terms only of order $10^{-6}$ to the reconstruction of the values assumed by f on this set. A conservative estimate, taking into account the number of closest omitted nodes and an assumed uniform upper bound on f of 20, suggests that $\epsilon_f < 10^{-3}$ on A if this value of $\rho$ is used. Using this bound and a value $k_d = 5$ for the feedback gain, results in deadzone $\Phi = 2 \times 10^{-4}$ for use in the adaption law and sliding controller.

The complete control law is given by equations (13), (16) and (20). Since the nonlinearity f is assumed to be uniformly upper bounded over the range outside of the expanded operating range by 20, the gain $k_{sl} = 20 + 10^{-3}$ is used in the sliding controller. The bandwidth of the sliding surface is taken as $\lambda = 10$ in the definition of s(t).

The true plant is modeled by equation (1) with $n=2$ and:

$$f(x,x) = -4\left(\frac{\sin(4\pi x)}{\pi x}\right)\left(\frac{\sin(\pi x)}{\pi x}\right)^2 \qquad (40)$$

Which is indeed spatially bandlimited, its spectrum resembling a "roof" of length 2 and width 1. The plant and controller dynamics were simulated in C on DECStation 3100 RISC workstations, using a forth order, fixed stepsize Runge-Kutta algorithm with $\Delta t = 10^{-4}$sec. All initial conditions were taken as 0, reflecting the fact that no prior knowledge is assumed about the plant save for its order and upper bounds on both the absolute magnitude of the function f and on the spectral radius of its spatial Fourier transform.

Figure 11A:
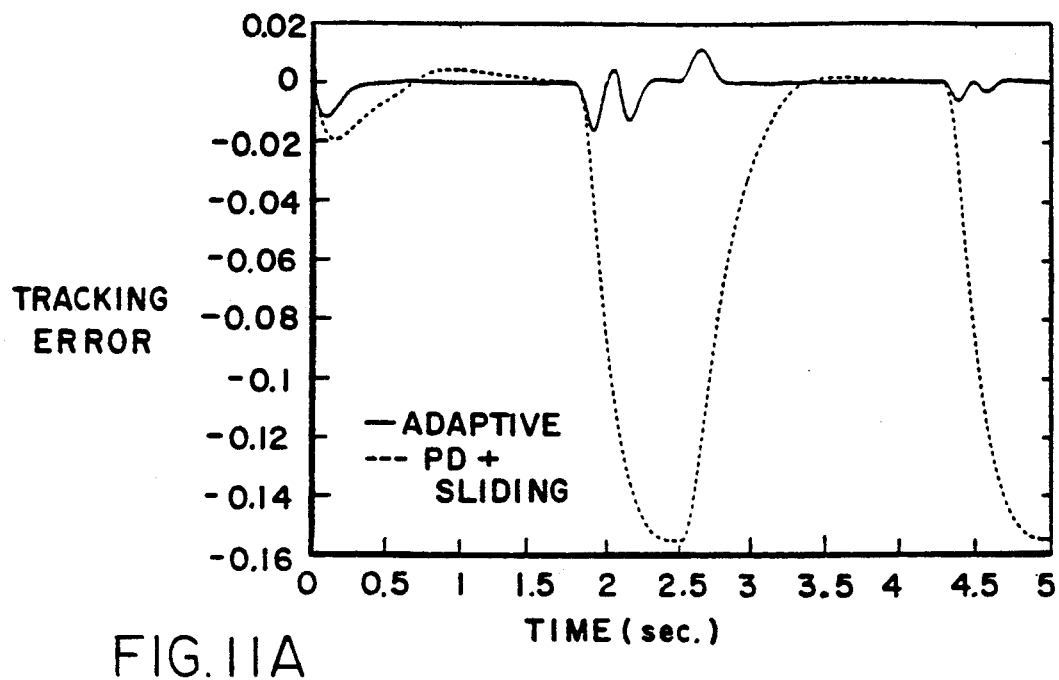
FIG. 11A is a graph of tracking error provided to the plant versus time for the first five seconds of the first simulation.
Figure 11B:
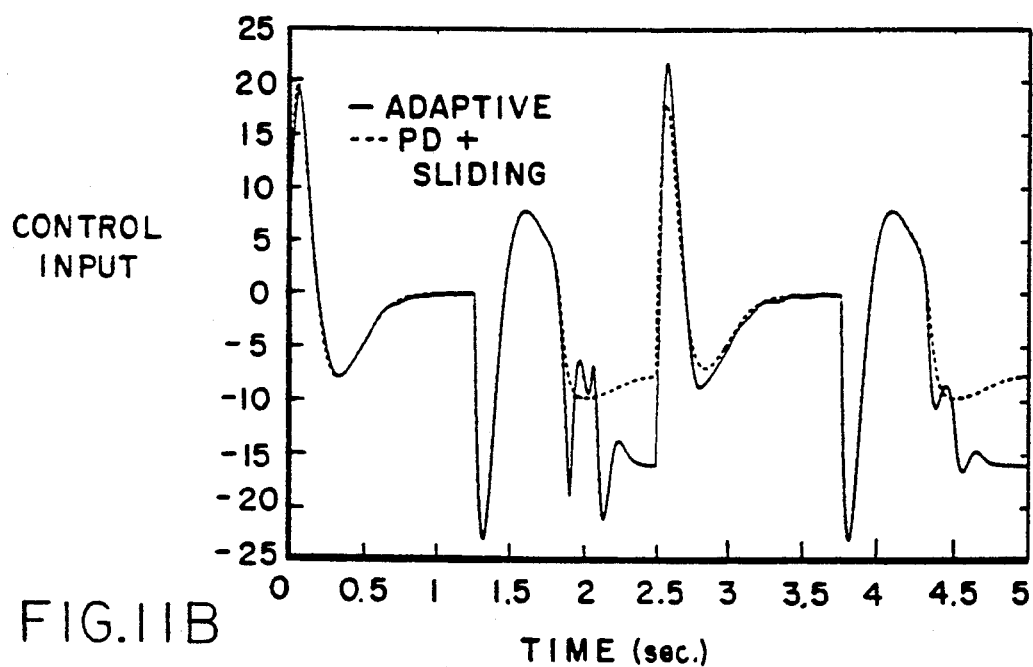
FIG. 11B is a graph of control signals provided to the plant versus time for the first five seconds of the first simulation.
Figure 12:
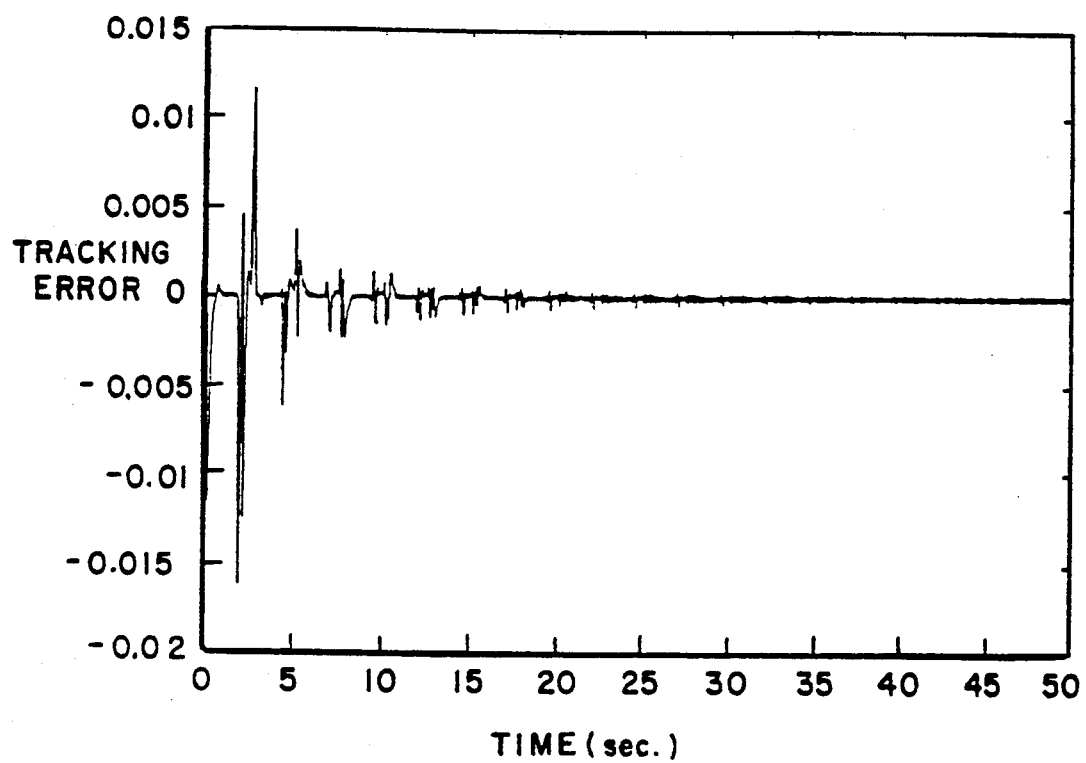
FIG. 12 shows the tracking error using the inventive adaptive controller versus time during a fifty second period of the first simulation.

Two simulations were conducted, one in which the complete control law (20), including the adaptive gaussian network, was employed, and one in which only the PD and sliding components were used. FIG. 11 compares the position tracking error, x(t), and the total control signal issued to the plant during the first 5 seconds for both of these simulations. Use of the adaptive controller clearly results in superior tracking performance; worst case tracking error is reduced by a factor of ten compared with that obtained using PD and sliding components alone during this time period, and this ratio continually improves as the adaptive controller learns more about the plant dynamics. FIG. 12 shows the tracking error using the adaptive controller during a fifty second period which does indeed demonstrate the predicted asymptotic convergence to the deadzone.

An additional simulation was performed again using a two-dimensional plant with the same f nonlinearity used in the unity gain simulation, but with b in equation (1) given by:

$$b(x) = 2 + \sin(3\pi(x - 0.5)) \qquad (41)$$

Note that in this case, the constant function 2 is not Fourier transformable in the classical sense (although it is in the distributional sense), but it can easily be approximated by a function which is 2 on A and decays smoothly to 0 on $A^c$. Furthermore, $b^{-1}$ is uniformly lower bounded by $M_1 = \frac{1}{3}$ and upper bounded by $M_2 = 1$, and $b^{-1}$ can be uniformly bounded using $M_3 = 3\pi$, so that the control gains satisfy the constraints previously discussed.

The desired trajectories described above with respect to the unity gain simulation are used, and the same network designed in that section is used to generate both $h_A$ and $b^{-1}$ by adding a new set of output weights, $d_I$, which are adjusted as specified in equation (35) with $k_{a2} = 1.0$. The maximum desired acceleration is $|x^{(n)}|\max = 25$ for these trajectories, so that $|a_r| \le 100$ when x is in A. Under the assumption that truncation errors dominate the uniform bounds on the approximation errors, $\epsilon_b$ is considered to be the same order as the $\epsilon_f$ computed in the previous section, and hence $\epsilon_r \le 0.1$ which suggests a choice of $\Phi = 0.02$ as the adaptation deadzone and sliding controller boundary layer.

The complete control law is given by equations (16), (32), and (34). Using the above bounds on b and f, and again the value $K_d = 5$, the sliding controller gains are taken as $K_{sl} = 20 + |a_r|$.

Figure 13A:
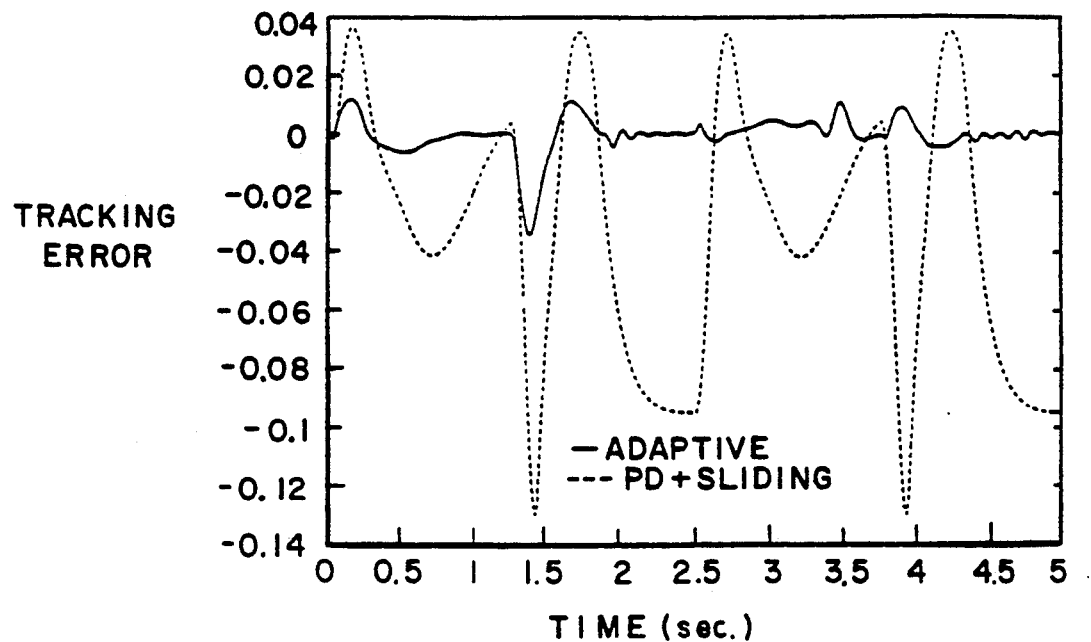
FIG. 13A is a graph showing tracking error versus time during the first five seconds for a second simulation.
Figure 13B:
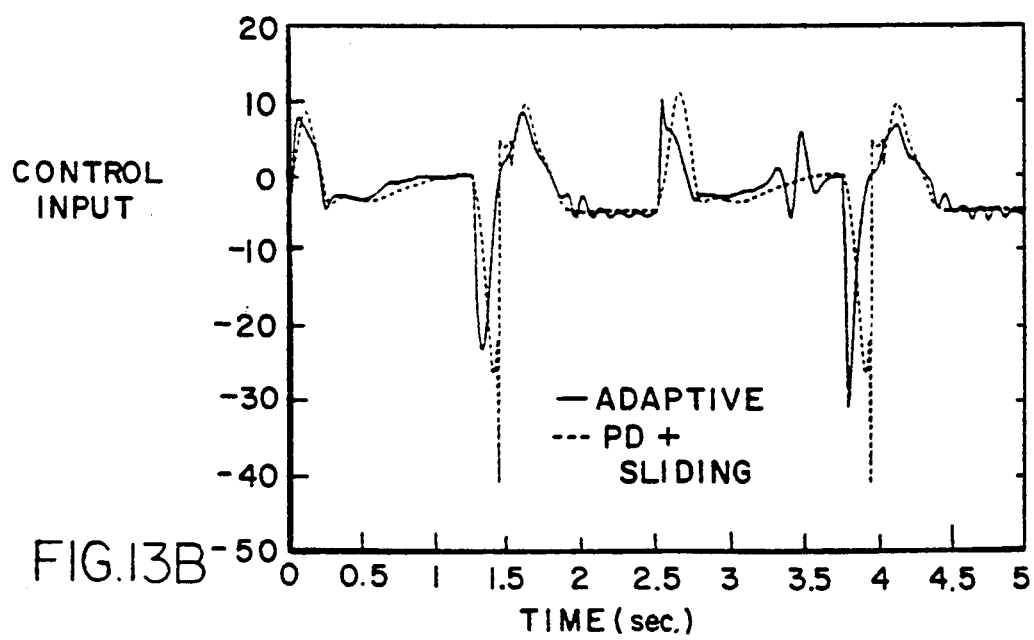
FIG. 13B is a graph showing control signals versus time during the first five seconds for a second simulation.

The same simulation parameters and initial conditions as above are chosen. Once again, two simulations were conducted, one with and the other without the contribution of the adaptive network. FIG. 13 shows both the position tracking error and control signals input to the plant during the first 5 seconds for both these simulations. Once again, it is evidence that the use of the adaptive controller provides superior performance,; initial tracking errors are about three times better than those of the PD and sliding controller alone, with this ratio improving dramatically after the first few seconds. Notice the larger control inputs in places for the simulation without the adaptive component; these occur as the plant state drifts outside the set A prompting full use of the sliding component of the controller.

Figure 14:
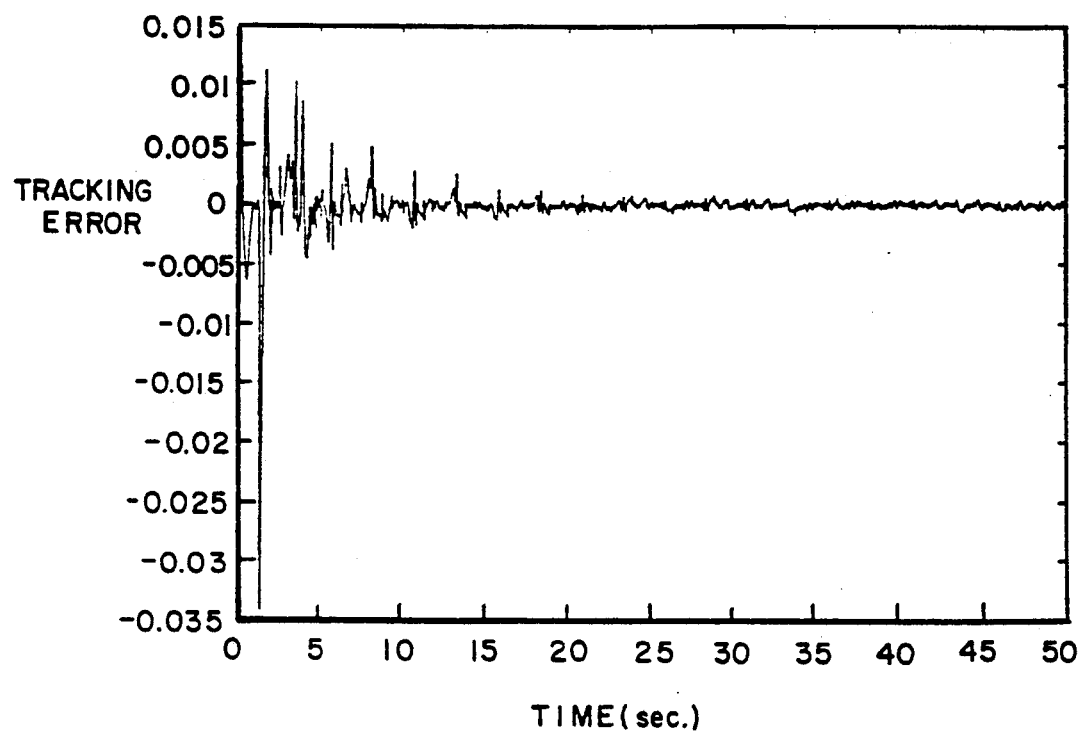
FIG. 14 is a graph showing the position tracking error during the first fifty seconds for a second simulation using the inventive adaptive controller.

FIG. 14 shows the tracking error for the adaptive controller over the first 50 seconds of operation; again, it is evident that the errors have converged into the deadzone.

FIG. 1 shows a schematic block diagram of a conventional model reference adaptive control system. In FIG. 1 the box 106 represents the plant of the system to be controlled. In general, in order to use this model with prior art theory, it is assumed that the dynamic equations governing the plant are subject to a known linear parameterization, although the exact operating parameters of the plant are generally unknown or unpredictable. However, in accordance with the invention, it has been shown that it is not necessary to know an explicit linear parameterization of the dynamics and that these can be approximated by means of an adaptive neural network. The plant generates an output vector x on bus 114.

The reference model 104 is used to specify the ideal response of the adaptive control system to an external reference command are provided on lead 100 through the system. Essentially, the reference model generates an ideal plant response to the reference input r. The adaptive mechanism represented by box 108 then seeks to adjust the parameters of controller 102 so that the plant reproduces this ideal response. The reference model receives the input from lead 100 via lead 103 and generates an output vector $x_d$ on bus 110. The output of the plant on bus 114 and the output of the reference model on lead 110 are provided to the subtraction circuit 112 which generates the tracking error $x-x_d$ vector on bus 116.

Controller 102 is constructed with a number of adjustable parameters which change how the control output u generated on bus 120 is related to the input R on lead 100 and feedback from bus 118. The controller is adjusted by an adaptive mechanism 108 which is responsive to the tracking error on lead 116 to generate adjustment signals $c_L$ and $d_L$ on leads 122. These adjustment signals change the controller parameters so that the tracking error is reduced to zero over a period of time. In addition, the controller 102 is generally provided with the output of the plant 106 by means of bus 118.

In accordance with the invention, the conventional MRAC controller is modified slightly to both simplify it and restructure the network to operate with the theory presented above. A comparison of FIGS. 1 and 2 indicates that the corresponding elements are corresponding numeral designations. For example, plant 106 in FIG. 1 is labeled plant 206 in FIG. 2. Similarly, controller 102 in FIG. 1 is labeled controller 202 in FIG. 2.

Figure 2:
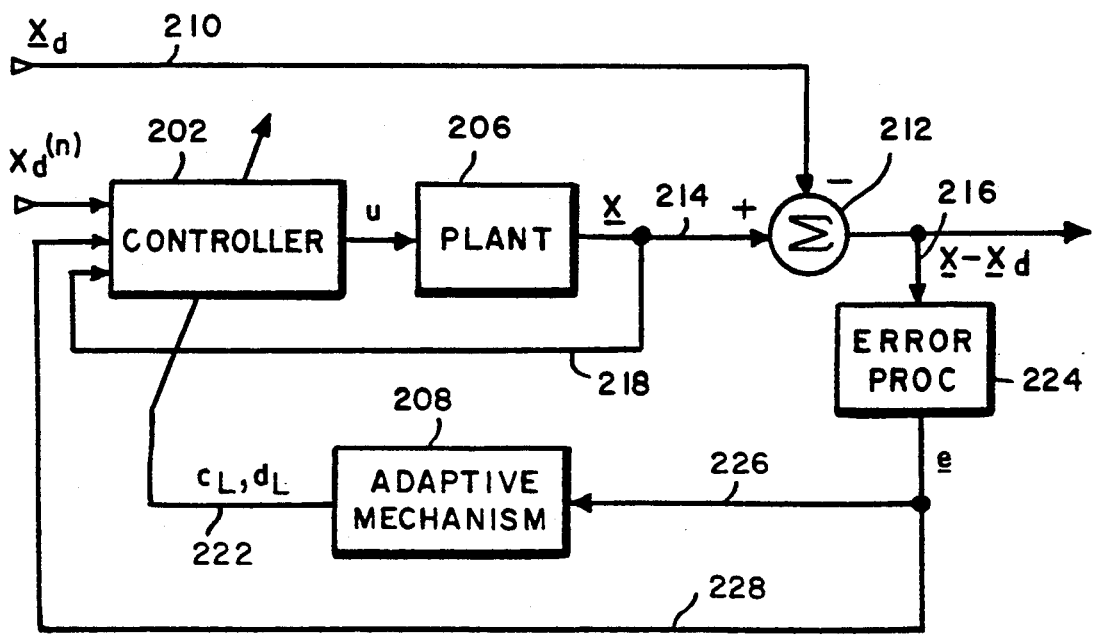
FIG. 2 is a block schematic diagram of an MRAC adaptive control system which has been modified for use with the present invention.

FIG. 2 has been simplified by eliminating the reference model 104 in FIG. 1. Instead, the desired plant output vector, $x_d$ on bus 210 is provided directly to the summing network 212. The parameters of the output $x_d$ can be calculated ahead of time either in explicit reference model or by calculations provided to the summing network.

In addition, tracking error vector $x-x_d$ on bus 216 is provided to an error processing circuit 224 which generates a set of error "metric" variables represented by e. These error variables, which include the metrics s, $s_\Delta$ and $a_r$, are provided to the adaptive mechanism 208 and also directly by means of lead 220 to the controller 202.

Figure 3:
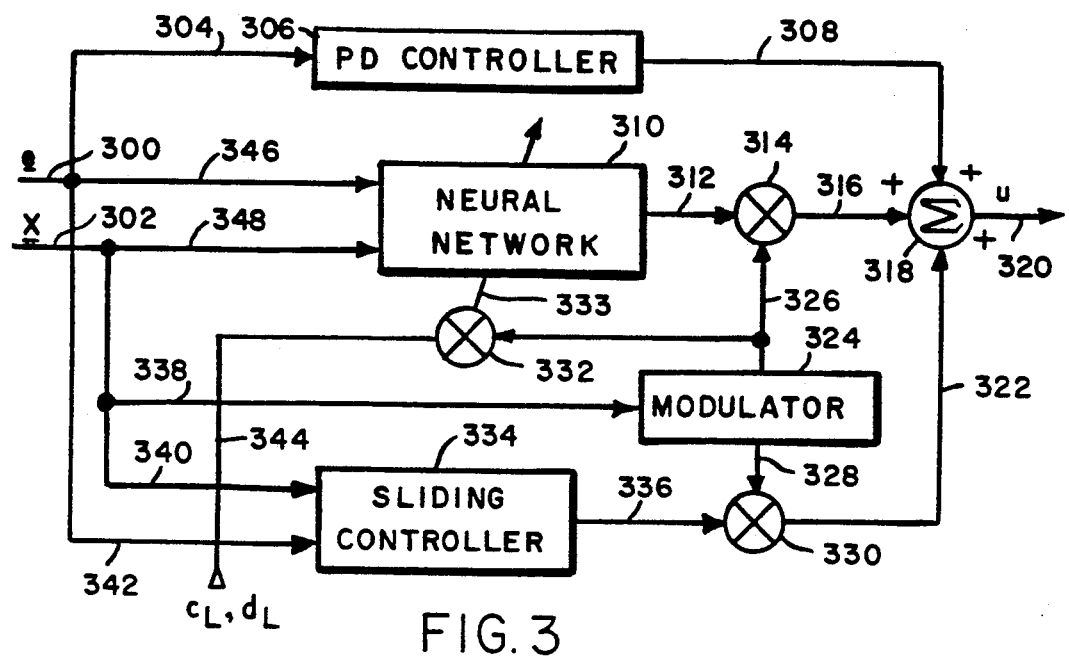
FIG. 3 is a block schematic diagram of an illustrative controller design constructed in accordance with the principles of the present invention.

FIG. 3 shows a block schematic diagram of controller 202 in FIG. 2. The controller receives the error signals e on lead 300 from the error processing circuit 224 shown in FIG. 2. In addition, the output vector x of the plant is received, via bus 302. The error signals e are provided via leads 304 to a proportional/differential controller 306. This is a conventional controller which provides damping to the system. The output of the proportional controller 308 is provided to a summing circuit 318.

The error signals on leads 300 are also provided by leads 342 to a sliding controller 334. Sliding controller 334 also receives the plant output on bus 302 via bus 340. Sliding controller 334 is a conventional circuit of which the exact construction is described below. The general principles of construction of sliding controllers are set forth in the book entitled "Applied Nonlinear Control" by Jean Jacques Slotine and Weiping Li, Prentice Hall, Englewood Cliffs, New Jersey, 07632, 1991, chapter 7. The output 336 of sliding controller 334 is provided to a multiplier circuit 330 which is in turn controlled by means of signals on lead 328 by modulator 324. Modulator 324 also provides output 326 which controls multipliers 314 and 332. These in turn control the outputs and adaptation mechanisms of a neural network 310.

Neural network 310 receives the error signals e on bus 300 by means of bus 346 and the output of the plant on bus 302 by means of bus 348. The construction and operation of the neural network will be described hereinafter in detail below. However, the neural network generates an adaptive portion of the control signal which is effective in the normal operating range of the plant. The output of the network on bus 312 is provided to multiplier 314.

Modulator 324 controls multipliers 330, 314, and 332 as previously stated. In order to switch the control of the network smoothly between the neural network 310 and the output of the sliding controller 334. Depending on whether the control system is operating in its normal operating range or outside of its normal operating range the modulator 324 is arranged so that control is smoothly switched from the neural network 310 to sliding controller 334 as the control system approaches the edges of the normal operating range. In addition, the parameter adaptation signals on 344 provided by the adaptive mechanism 208 (FIG. 2) are also controlled by multiplier 332 which provides a modulated output via bus 333 to control the learning rate of neural network 310.

As the system moves outside the normal operating range, the adaptation control parameters and the output of the neural network are reduced smoothly to zero. This smooth modulation technique prevents chattering in the network when the plant is operating near the edge of its normal operating range.

Modulated outputs of neural network 310 on bus 316 and of sliding controller 334 on bus 322 are also provided to summing network 318 Network 318 sums the output of PD controller 306, neural network 310 and sliding controller 334 to provide controller output on bus 320.

Figure 4:
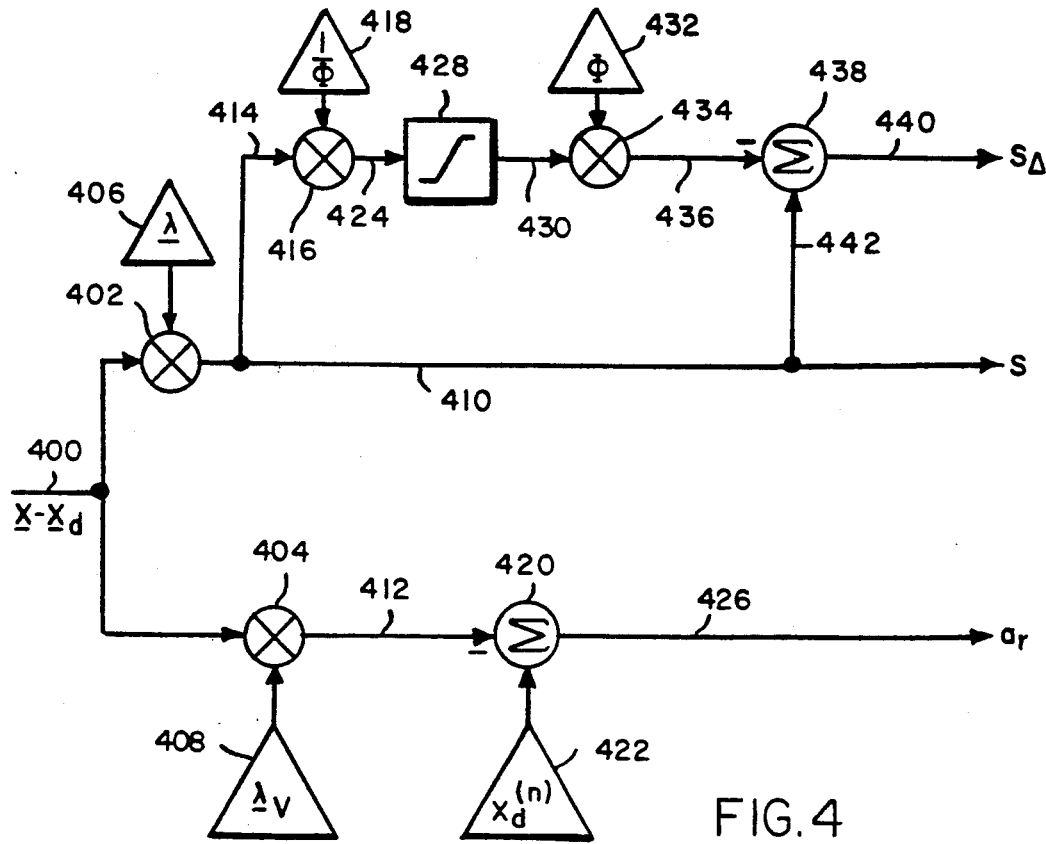
FIG. 4 is an expanded block schematic diagram of the tracking error processing circuit 224 as shown in FIG. 2.

FIG. 4 of the drawing is an expanded block diagram of the circuitry which generates the error metrics $s_\Delta$, s and $a_r$. In particular, the tracking error vector, $x-x_d$, is provided on input bus 400. In order to compute the error metric $a_r$, the tracking error signals are provided to a set of multipliers illustrated schematically by multiplier 404. By convention in the drawings which follow if two inputs entering a multiply junction are underlined, they represent a collection of signals (a vector) and the multiplier should be understood to implement the vector dot product:

$$x^T \lambda = \Sigma x_i \lambda_i$$

For example, multiplier 404 forms the "dot" product of the tracking vector with a constant vector $\lambda$. These constants are entered by the user by means of an entry point shown schematically as triangle 408. In FIG. 4 and the following figures, the triangles indicate inputs supplied by the user and are selected in accordance with the aforementioned theory. The resulting products are summed to generate the "dot" product.

The product generated by multipliers 404 are provided, via bus 412, to a summer 420 which forms differences between the feedforward signal (the nth derivative of the desired state $x_d^{(n)}$) provided at entry point 422 and the product developed by multipliers 404. The output on lead 426 is the error metric $a_r$.

The error metrics $s_\Delta$ and s are developed by the upper portion of the circuitry. In particular, the tracking error vector is provided to a set of multipliers, 402, which multiply the tracking errors by constants, $\lambda$, provided from the user entry point 406 in order to generate the error metric s on lead 410. The error metric s on lead 410 is provided by a lead 414 to a multiplier 416 where it is multiplied by a constant $1/\Phi$ provided via user entry point 418. The product on lead 424 is provided to a saturation circuit 428. Circuit 428 processes the signal in accordance with the following equation.

sat(y)=y if $|y|<1$, and sat (y)=sign (y) otherwise

The saturated value appears on lead 430 and is applied to a multiplier 434 where it is multiplied by the reciprocal of the value supplied in 418 ($\Phi$) provided via user entry point 432. The resulting product on lead 436 is applied to a summer 438 which forms a difference between the s error metric provided on lead 442 and the product of multiplier 434. The result on lead 440 is the error metric $s_\Delta$. The error metrics generated by the error processing circuitry shown in FIG. 4 are used in the remainder of the circuitry to generate various quantities as will hereinafter be described.

Figure 5:
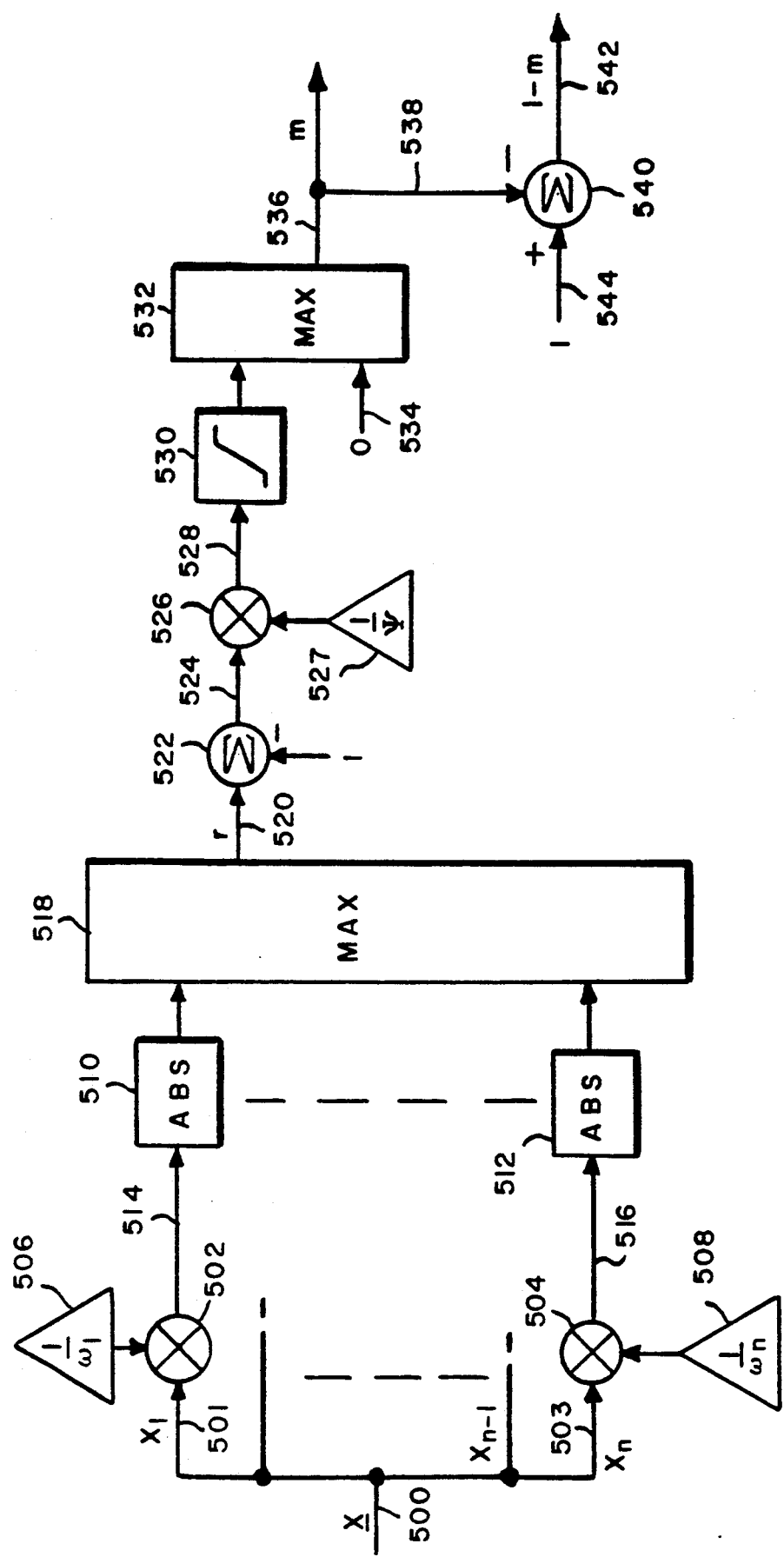
FIG. 5 is an expanded block schematic diagram of the modulator circuit 324 as shown in FIG. 3.

FIG. 5 is a detailed block schematic diagram of modulator circuit 324 shown in FIG. 3. Modulator operates to generate the modulation signals m and 1-m which are used to smoothly switch from the adaptive controller to the sliding controller as previously described. The plant output vector x is provided, via bus 500, to a plurality of multiplier circuits of which only circuits 502 and 504 are shown. In particular, each component of the plant output (such as components $x_1$ on lead 501 and $x_n$ on lead 503) is applied to a separate multiplier. Multiplier 502 is provided with a coefficient $1/\omega_1$ applied via user entry point 506. Similarly multiplier 504 receives a coefficient $1/\omega_n$ applied via user entry point 508. The weighted inputs are forwarded to absolute value circuits 510–512 by means of a plurality of leads including leads 514 and 516. The absolute value of the weighted inputs generated by circuits 510–512 is then provided to a maximum circuit 518 which selects the signal with the maximum magnitude and applies the selected signal (r) to lead 520. The maximum signal r is applied to a summer 522 which subtracts 1 from the result. The resulting difference is applied, via lead 524, to a multiplier 526 where it is multiplied by the user-supplied constant $1/\Psi$ provided via use entry point 527.

The resulting product on lead 528 is provided to a saturation circuit 530. The function of the saturation circuit is as previously discussed. The saturated output is provided to another maximum circuit 532 which selects the maximum of the saturated output of circuit 530 and the signal value "zero" provided on lead 534 to generate the modulation output m on lead 536. The modulation output is provided, via lead 538, to the negative input of an adder 540 and subtracted from 1 to generate the signal 1-m on lead 542.

Referring to FIG. 3, the modulation signal m is applied, via lead 328, to multiplier 330 to modulate the output of the sliding controller 334. In addition, the modulation value 1 m is provided, via lead 326, to multipliers 314 and 332 in order to control the output of neural network 310 and the adaptation control signals to neural network 310.

Figure 6:
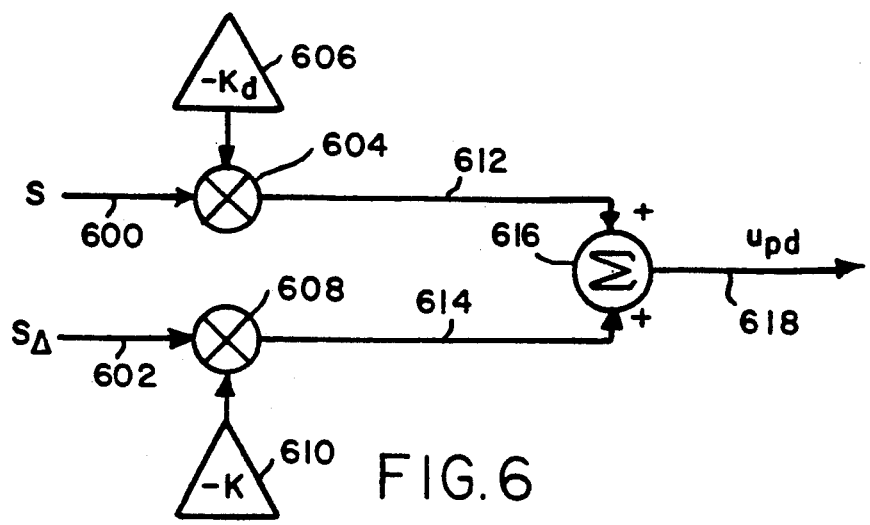
FIG. 6 is an expanded block schematic diagram of the proportional/derivative controller 306 as shown in FIG. 3.

FIG. 6 illustrates the construction of an illustrative proportional/differential controller which generates the output control signal $u_{pd}$ from the input error metrics s and $s_\Delta$. In particular, the error metric s is provided on lead 600 to multiplier 604 where it is multiplied by constant $-K_d$ (provided via user input 606) in order to generate a product on lead 612. The resulting product is applied to one input of an adder 616. In a similar manner, the error metric $s_{66}$ provided on lead 602 is forwarded to multiplier 608 where it is multiplied by constant $-K$ provided at user input 610. The resulting product on lead 614 is also applied to adder 616 which adds together the two signals to generate the output control signal $u_{pd}$ on lead 618.

Figure 7:
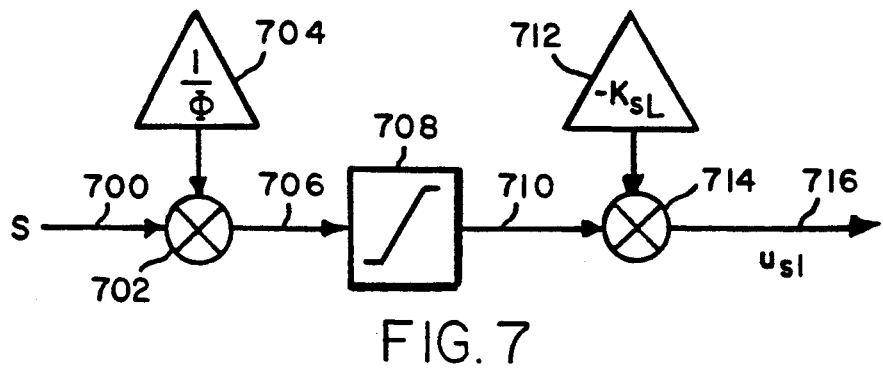
FIG. 7 is an expanded block schematic diagram of the sliding controller 334 as shown in FIG. 3.

FIG. 7 shows the construction of the sliding controller 334 in FIG. 3. It uses the error metric s provided on lead 700 as an input to multiplier 702. Multiplier 702 multiplies s by the constant $1/\Phi$ provided by the user input 704. The resulting product is applied to a saturation circuit 708, which operates as previously described. The saturated output on lead 710 is applied to multiplier 714 where it is multiplied by user supplied constant $-K_{s1}$ provided via input point 712. The resulting product on lead 716 is the sliding controller output $u_{sl}$.

Figure 8:
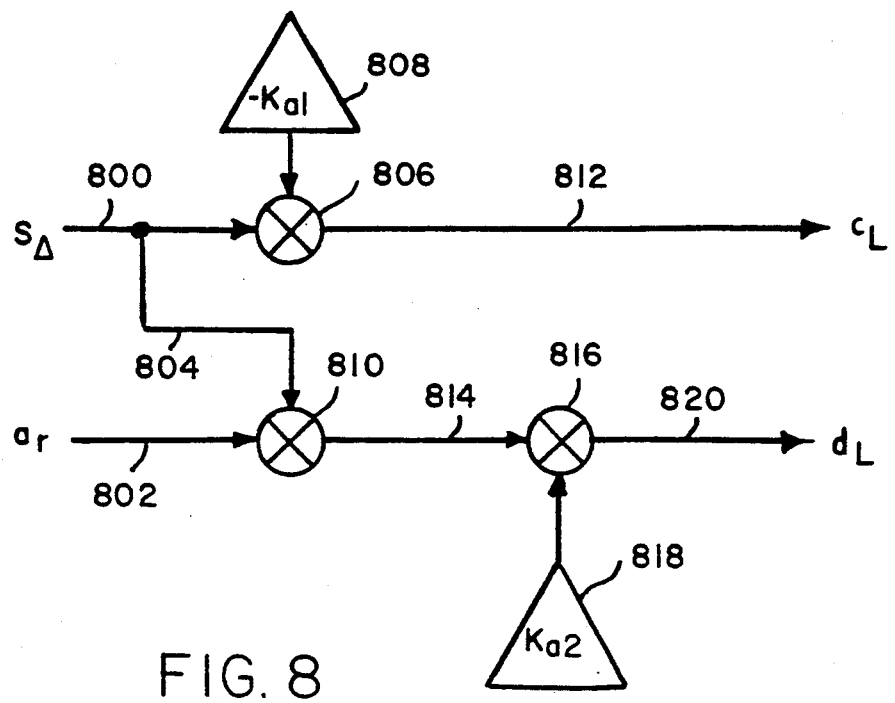
FIG. 8 is an expanded block schematic diagram of the adaptation mechanism 208 as shown in FIG. 2.

FIG. 8 shows the construction of the adaptive mechanism 208 shown in FIG. 2. It utilizes the error metrics $s_\Delta$ and $a_r$ to generate the control signals $c_L$ and $d_L$. In particular, the error metric $s_\Delta$ provided on lead 800 is applied to a multiplier 806 where it is multiplied by the user supplied constant $-K_{al}$ provided via input point 808. The resulting product on lead 812 is the adaptation control signal $c_L$.

The error metric $s_\Delta$ is also provided, via lead 804, to one input of multiplier 810. The other input of multiplier 810 is provided with the error metric $a_r$ on lead 802. The resulting product on lead 814 is provided to multiplier 816 where it is multiplied by the user supplied constant $K_{a2}$ provided via input point 818. The resulting product on lead 820 is the control signal $d_L$.

Figure 9:
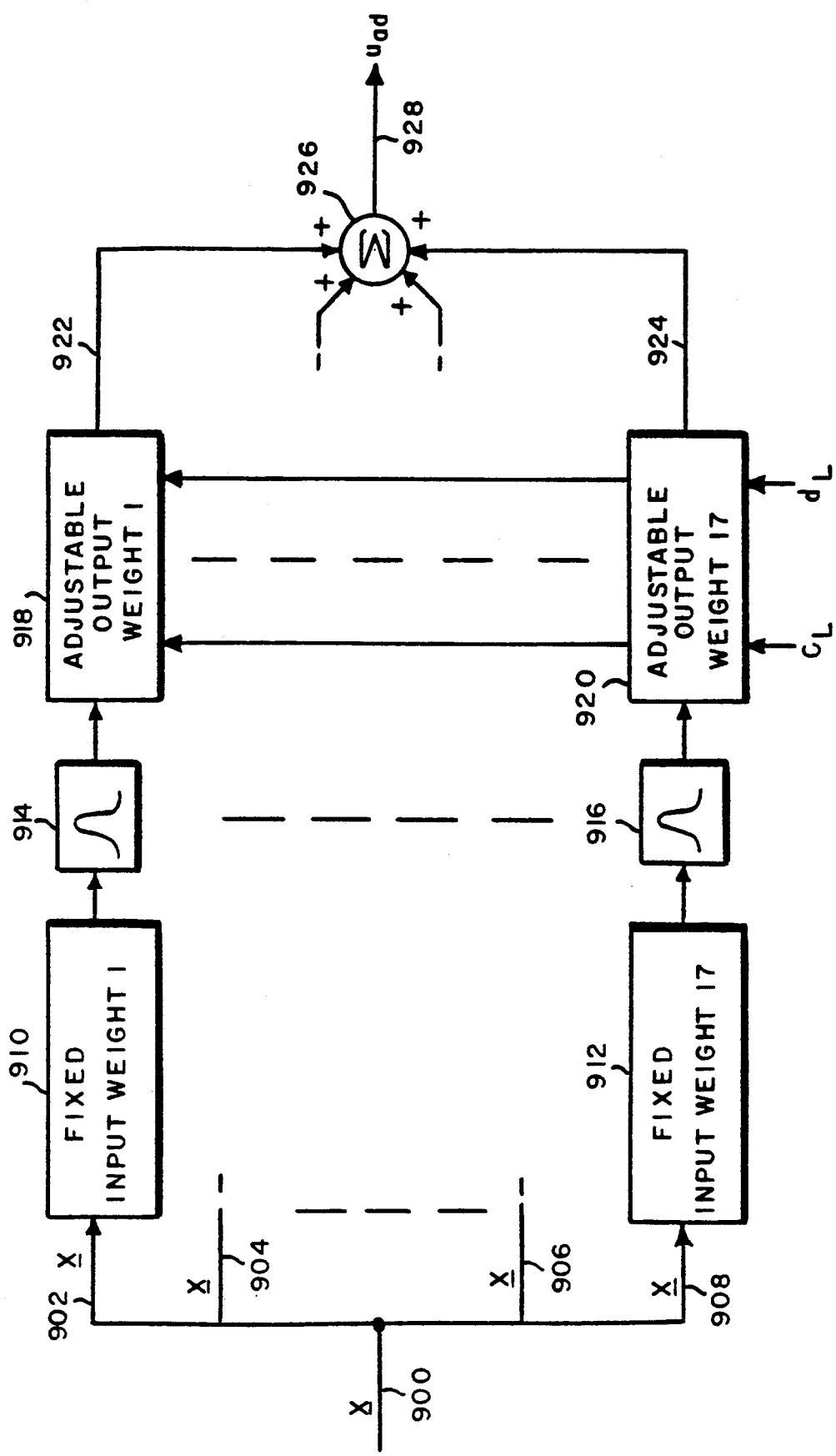
FIG. 9 is an expanded block schematic diagram of the neural network controller 310 as shown in FIG. 3.

FIG. 9 shows the construction of the neural network 310 shown in FIG. 3. The neural network receives the plant output vector x on bus 900. The bus is split into a plurality of parallel busses shown schematically as leads 902, 904, 906 and 908. The number of busses is equal to the number of nodes in the network as discussed above. Each separate bus carries the vector x and is processed in a similar manner and therefore only two busses are shown in detail.

More specifically, each plant output vector is processed by appropriately weighting the variables in a plurality of processing circuits of which circuits 910 and 912 are shown. The processing performed by processing circuits 910–912 is described by equation (3) which specifies the formation of the radial gaussian function. During this formation an input weight $\xi$ is subtracted from each plant output variable and the absolute value of the resulting difference is squared and divided by variance $\sigma^2$ of the gaussian.

The outputs of the input processing circuits 910–912 are provided to a plurality of nodes of which nodes 914–916 are shown. These nodes form the radial gaussian of their inputs and the processed signals are provided to processing circuits 918–920 which multiply resulting outputs via adjustable output weights.

The adjustable output weights are controlled by the modulated adaptation signals $(1-m)c_L$ and $(1-m)d_L$ provided by the output of multiplier 332 shown in FIG. 3. In fact, the adaptation mechanism controls the magnitude of the output constants $c_I$ in equation (4). In the case of a unity gain system, the actual values which are used to adjust the output weights are obtained by multiplying the output of gaussian circuits 914–916 by the adaptation signal $(1-m)c_L$. The resulting product is then integrated to produce the output weights $c_I$ which multiply the outputs of the gaussian circuits 914–916 in accordance with equation (23). In the case of a non unity gain system, operation is similar except that the outputs of the gaussian circuits 914–916 are multiplied separately by the adaptation signals $(1-m)c_L$ and $(1-m)d_L$ to generate two separate products which are then integrated to produce two weighting signals that are each multiplied by the outputs of circuits 914–916. The results of the $d_L$ multiplication are also multiplied by the error metric $a_r$ and the two resulting products are added in accordance with equation (37).

The weighted outputs of the adjustable output circuits 918–920 are provided, via leads 922–924, to an output summing circuit 926 which receives all of the outputs from the adjustable output circuits and provides the sum on output 928 which is the adaptive control output $u_{ad}$.

Although only a few embodiments of the present invention are disclosed above, other embodiments and modifications will be immediately apparent to those skilled in the art. For example, the techniques discussed above can be used to extend the above ideas to much more general classes of systems, including multiple input and output plants. If perfect tracking can be accomplished through reconstruction of the values assumed by unknown nonlinear functions on a compact set, and a measure of the tracking error can be found which is related to the function reconstruction errors by a passive operator, then gaussian networks of the type described above can be used to adaptively compensate for the nonlinearities, and reduce tracking errors to a neighborhood of the zero.

What is claimed is:

1. A control system for controlling a non-linear plant having a plurality of outputs so that each of said plurality of plant outputs approaches a corresponding desired plant output, said plant outputs having a predetermined plurality of values constituting a normal operating range and a plurality of values outside of said normal operating range, said control system having means responsive to said plurality of plant outputs and to said plurality of desired plant outputs for generating a plurality of tracking error variables, said control system comprising:

a first controller having a plurality of variable adaptation parameters and being responsive to said plurality of tracking error variables, to said plurality of plant outputs and to said plurality of desired plant outputs for generating first control outputs for controlling said plant;

an adaptive mechanism responsive to said plurality of tracking error variables for adjusting said variable adaptation parameters;

a second controller having a plurality of fixed parameters and being responsive to said plurality of tracking error variables, to said plurality of plant outputs and to said plurality of desired plant outputs for generating second control outputs for controlling said plant; and means responsive to said plurality of plant outputs for applying said first control outputs to said plant when said plurality of plant outputs are within said normal operating range and for applying said second control outputs to said plant when said plurality of plant outputs are outside of said normal operating range.

2. A control system according to claim 1 wherein said first controller comprises a neural network.

3. A control system according to claim 2 wherein said neural network comprises a plurality of nodes, each of said plurality of nodes comprising an interpolator circuit, said neural network further comprising means for generating a weighted set of tracking error variables and means for applying said weighted set of tracking error variables to each of said nodes to produce interpolated outputs.

4. A control system according to claim 3 wherein said means for generating a weighted set of tracking error variables comprises means for multiplying each of said plurality of tracking error variables by a predetermined, fixed weight value.

5. A control system according to claim 3 wherein said neural network further comprises means for generating a weighted set of interpolated outputs and means for summing said weighted set of interpolated outputs to generate said first control outputs.

6. A control system according to claim 5 wherein said means for generating a weighted set of interpolated outputs comprises means for multiplying each of said plurality of interpolated outputs by said variable adaptation parameters.

7. A control system according to claim 3 wherein each of said interpolator circuits multiplies one of said weighted set of tracking error variables by a predetermined interpolation function.

8. A control system according to claim 7 wherein said interpolation function is a radial Gaussian interpolation function.

9. A control system according to claim 1 wherein said second controller comprises a sliding controller.

10. A control system according to claim 1 wherein said applying means comprises a first modulator circuit responsive to said plurality of plant outputs for multiplying said first control outputs by a first modulation variable having a magnitude which decreases as said plant outputs move from said normal operating range to outside of said normal operating range to generate first modulated control outputs.

11. A control system according to claim 10 wherein said applying means comprises a second modulator circuit responsive to said plurality of plant outputs for multiplying said second control outputs by a second modulation variable having a magnitude which increases as said plant outputs move from said normal operating range to outside of said normal operating range to generate second modulated control outputs.

12. A control system according to claim 11 wherein said applying means further comprises means for summing said first modulated control outputs and said second modulated control outputs to generate a plant control signal which smoothly changes from said first control outputs to said second control outputs as said plant outputs move from said normal operating range to outside of said normal operating range.

13. A control system according to claim 1 further comprising a proportional/differential controller responsive to said plurality of tracking error variables for generating third control outputs and means for summing said first control outputs, said second control outputs and said third control outputs to generate a control sum and means for applying said control sum to said plant.

14. A control system for controlling a non-linear plant having a plurality of outputs so that each of said plurality of plant outputs approaches a corresponding desired plant output, said plant outputs having a predetermined plurality of values constituting a normal operating range, a plurality of values constituting an abnormal operating range outside of said normal operating range and a plurality of values in a transition operating range between said normal operating range and said abnormal operating range, said control system comprising:
  means responsive to said plurality of plant outputs and to said plurality of desired plant outputs for generating a plurality of tracking error variables;
  a neural network having a plurality of variable weighting factors and being responsive to said plurality of tracking error variables, to said plurality of plant outputs and to said plurality of desired plant outputs for generating adaptive control outputs for controlling said plant;
  an adaptive mechanism responsive to said plurality of tracking error variables for adjusting said variable weighting factors; and
  a sliding controller having a plurality of fixed parameters and being responsive to said plurality of tracking error variables, to said plurality of plant outputs and to said plurality of desired plant outputs for generating sliding control outputs for controlling said plant
  a modulator responsive to said plurality of plant outputs for applying said adaptive control outputs to said plant when said plurality of plant outputs are within said normal operating range, for applying said sliding control outputs to said plant when said plurality of plant outputs are in said abnormal operating range and for applying a linear combination of said adaptive control outputs and said sliding control outputs to said plant when said plurality of plant outputs are in said transition operating range.

15. A control system according to claim 14 wherein said neural network comprises a plurality of nodes, each of said plurality of nodes comprising an interpolator circuit, said neural network further comprising means for generating a weighted set of tracking error variables and means for applying said weighted set of tracking error variables to each of said nodes to produce interpolated outputs.

16. A control system according to claim 15 wherein said means for generating a weighted set of tracking error variables comprising means for multiplying each of said plurality of tracking error variables by a predetermined, fixed weight value.

17. A control system according to claim 16 wherein said neural network further comprises means for generating a weighted set of interpolated outputs and means for summing said weighted set of interpolated outputs to generate said adaptive control outputs.

18. A control system according to claim 17 wherein said means for generating a weighted set of interpolated outputs comprises means for multiplying each of said plurality of interpolated outputs by said variable weighting factors.

19. A control system according to claim 18 wherein each of said interpolator circuits multiplies one of said weighted set of tracking error variable by a predetermined interpolation function.

20. A control system according to claim 19 wherein said interpolation function is a radial Gaussian interpolation function.

21. A control system according to claim 20 wherein said radial Gaussian interpolation function has a standard deviation and a mean which depend on the frequency chracteristics of said plant outputs.

22. A control system according to claim 21 wherein said neural network has a predetermined number of nodes which predetermined number depends on the frequency characteristics of said plant outputs.

23. A control system according to claim 14 wherein said modulator comprises a first modulator circuit responsive to said plurality of plant outputs for multiplying said adaptive control output by a first modulation variable to generate modulated adaptive control outputs, said first modulation variable having a magnitude which is "1" when said plant outputs are inside said normal operating range, which is between "0" and "1" when said plant outputs are in said transition operating range and which is "0" when said plant outputs are in said abnormal operating range.

24. A control system according to claim 23 wherein said modulator comprises a second modulator circuit responsive to said plurality of plant outputs for multiplying said sliding control outputs by a second modulation variable to generate modulated sliding control outputs, said second modulation variable having a magnitude which is "0" when said plant outputs are inside said normal operating range, which is between "0" and "1" when said plant outputs are in said transition operating range and which is "1" when said plant outputs are in said abnormal operating range.

25. A control system according to claim 24 wherein said first modulation variable and said second modulation variable sum to "1" for all plant outputs.

26. A control system according to claim 25 wherein said modulator further comprises means for summing said modulated adaptive control outputs and said modulated sliding control outputs to generate a plant control signal which smoothly changes from said adaptive control outputs to said sliding control outputs as said plant outputs move from said normal operating range through said transition operating range to said abnormal operating range.

27. A control system according to claim 14 further comprising a proportional/differential controller responsive to said plurality of tracking error variables for generating proportional/differential control outputs and means for summing said adaptive control outputs, said sliding control outputs and said proportional/differential control outputs to generate a control sum and means for applying said control sum to said plant.

28. In a control system for controlling a non-linear plant having a plurality of outputs so that each of said plurality of plant outputs approaches a corresponding desired plant output, said plant outputs having a predetermined plurality of values constituting a normal operating range and a plurality of values outside of said normal operating range, said control system having means responsive to said plurality of plant outputs and to said plurality of desired plant outputs for generating a plurality of tracking error variables, a first controller having a plurality of variable adaption parameters and being responsive to said plurality of tracking error variables, to said plurality of plant outputs and to said plurality of desired plant outputs for generating control outputs for controlling said plant, and an adaptive mechanism responsive to said plurality of tracking error variables for adjusting said variable adaption parameters, the improvement wherein said first controller comprises:
- a neural network having a plurality of nodes, each of said plurality of nodes comprising a radial Gaussian interpolator circuit;
- means for generating a weighted set of tracking error variables;
- means for applying said weighted set of tracking error variables to each of said nodes to produce interpolated outputs;
- means responsive to said variable adaption parameters for generating a weighted set of interpolated outputs; and
- means for summing said weighted set of interpolated outputs to generate said control outputs.

29. In a control system, the improvement according to claim 28 wherein said means for generating a weighted set of interpolated outputs comprises means for multiplying each of said plurality of interpolated outputs by said variable adaption parameters.

30. In a control sytsem, the improvement according to claim 28 wherein said means for generating a weighted set of tracking error variables comprises means for multiplying each of said plurality of tracking error variables by a predetermined, fixed weight value.

31. In a control sytem, the improvement according to claim 30 wherein said means for generating a weighted set of interpolated outputs comprises means for multiplying each of said plurality of interpolated outputs by said variable adaptation parameters.

32. In a control system, the improvement according to claim 28 further comprising a second controller having a plurality of fixed parameters and being responsive to said plurality of tracking error variables, to said plurality of plant outputs and to said plurality of desired plant outputs for generating second control outputs for controlling said plant; and
- means responsive to said plurality of plant outputs for applying said control outputs to said plant when said plurality of plant outputs are within said normal operating range and for applying said second control outputs to said plant when said plurality of plant outputs are outside of said normal operating range.

33. In a control system, the improvement according to claim 32 wherein said second controller comprises a sliding controller.

34. In a control system, the improvement according to claim 32 wherein said applying means comprises a first modulator circuit responsive to said plurality of plant outputs for multiplying said control outputs by a first modulation variable having a magnitude which decreases as said plant outputs move from said normal operating range to outside of said normal operating range to generate first modulated control outputs.

35. In a control system, the improvement according to claim 34 wherein said applying means comprises a second modulator circuit responsive to said plurality of plant outputs for multiplying said second control outputs by a second modulation variable having a magnitude which increases as said plant outputs move from said normal operating range to outside of said normal operating range to generate second modulated control outputs.

36. In a control system, the improvement according to claim 35 wherein said applying means further comprises means for summing said first modulated control outputs and said second modulated control outputs to generate a plant control signal which smoothly changes from said first control outputs to said second control outputs as said plant outputs move from said normal operating range to outside of said normal operating range.

37. In a control system, the improvement according to claim 32 further comprising a proportional/differential controller responsive to said plurality of tracking error variables for generating third control outputs and means for summing said control outputs, said second control outputs and said third control outputs to generate a control sum and means for applying said control sum to said plant.

* * * * *